(12) United States Patent
Tanimoto

(10) Patent No.: US 8,443,088 B2
(45) Date of Patent: May 14, 2013

(54) FILE TRANSFER SERVER

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 645 days.

(21) Appl. No.: 11/870,622

(22) Filed: Oct. 11, 2007

(65) Prior Publication Data

US 2008/0091768 A1 Apr. 17, 2008

(30) Foreign Application Priority Data

Oct. 11, 2006 (JP) ................................ 2006-277246
Oct. 11, 2006 (JP) ................................ 2006-277372

(51) Int. Cl.
*G06F 15/16* (2006.01)

(52) U.S. Cl.
USPC ............ 709/227; 709/217; 709/218; 709/219

(58) Field of Classification Search .................. 709/227, 709/217, 218, 219
See application file for complete search history.

(56) References Cited

U.S. PATENT DOCUMENTS

| | | | |
|---|---|---|---|
| 5,848,134 A | 12/1998 | Sekiguchi et al. |
| 5,884,312 A | 3/1999 | Dustan et al. |
| 6,061,796 A | 5/2000 | Chen et al. |
| 6,111,883 A | 8/2000 | Terada et al. |
| 6,145,084 A | 11/2000 | Zuili et al. |
| 6,215,877 B1 | 4/2001 | Matsumoto |
| 6,222,536 B1 | 4/2001 | Kihl et al. |
| 6,226,692 B1 | 5/2001 | Miloushev et al. |
| 6,237,023 B1 | 5/2001 | Yoshimoto |
| 6,336,141 B1 | 1/2002 | Fujiyama et al. |
| 6,538,773 B1 | 3/2003 | Brossman et al. |
| 6,546,488 B2 | 4/2003 | Dillon et al. |
| 6,564,261 B1 | 5/2003 | Gudjonsson et al. |
| 6,574,656 B1 | 6/2003 | Nagaoka et al. |
| 6,594,246 B1 | 7/2003 | Jorgensen |
| 6,636,513 B1 | 10/2003 | Nishikawa et al. |

(Continued)

FOREIGN PATENT DOCUMENTS

| | | |
|---|---|---|
| EP | 1 054 547 A2 | 11/2000 |
| EP | 1 139 631 A1 | 10/2001 |

(Continued)

OTHER PUBLICATIONS

Tanimoto; "Relay Server, Communication System and Facsimile System"; U.S. Appl. No. 10/045,698, filed Jan. 10, 2002.

(Continued)

*Primary Examiner* — Firmin Backer
*Assistant Examiner* — Jonathan Bui
(74) *Attorney, Agent, or Firm* — Keating & Bennett, LLP

(57) ABSTRACT

A technique allows shared use of a file between different networks via the Internet. File transfer servers on different LANs access file servers on the respective LANs to prepare a list of shared files, respectively. The file transfer servers are registered in a SIP server, and then send a SUBSCRIBE method to each other to issue a request to transfer the file list, respectively. In response to the request, the file lists are exchanged. A communication terminal on each LAN makes a request to acquire a specific file on the basis of information about the shared files stored in the file transfer server. Through a media session, one of the file transfer servers issues a request to acquire the file to the other file transfer server. As a result, the file is transferred to the communication terminal.

10 Claims, 11 Drawing Sheets

U.S. PATENT DOCUMENTS

| | | |
|---|---|---|
| 6,754,212 B1 | 6/2004 | Terada et al. |
| 6,757,365 B1 | 6/2004 | Bogard |
| 6,760,763 B2 * | 7/2004 | Jennings et al. ............... 709/224 |
| 6,766,373 B1 | 7/2004 | Beadle et al. |
| 6,889,256 B1 | 5/2005 | Palevich et al. |
| 6,898,641 B1 | 5/2005 | Kobayashi |
| 6,950,879 B2 | 9/2005 | Zhou |
| 6,988,199 B2 | 1/2006 | Toh et al. |
| 7,000,248 B2 | 2/2006 | Mizukoshi |
| 7,120,927 B1 | 10/2006 | Beyda et al. |
| 7,139,811 B2 | 11/2006 | Lev Ran et al. |
| 7,174,378 B2 | 2/2007 | Yoon et al. |
| 7,263,528 B2 * | 8/2007 | Haff et al. ...................... 707/622 |
| 7,647,388 B2 | 1/2010 | Kato |
| 8,065,418 B1 | 11/2011 | Abuan et al. |
| 2001/0044819 A1 | 11/2001 | Gong |
| 2001/0047414 A1 | 11/2001 | Yoon et al. |
| 2002/0023143 A1 | 2/2002 | Stephenson et al. |
| 2002/0032616 A1 | 3/2002 | Suzuki et al. |
| 2002/0059436 A1 | 5/2002 | Kubo |
| 2002/0073182 A1 | 6/2002 | Zakurdaev et al. |
| 2002/0143956 A1 | 10/2002 | Tanimoto |
| 2002/0143960 A1 | 10/2002 | Goren et al. |
| 2002/0146002 A1 | 10/2002 | Sato |
| 2002/0152299 A1 | 10/2002 | Traversat et al. |
| 2002/0184224 A1 * | 12/2002 | Haff et al. ........................ 707/10 |
| 2003/0140637 A1 | 7/2003 | Masui et al. |
| 2003/0144872 A1 | 7/2003 | Masui et al. |
| 2004/0073610 A1 * | 4/2004 | Terada et al. .................. 709/203 |
| 2004/0078426 A1 | 4/2004 | Nagami et al. |
| 2004/0083385 A1 | 4/2004 | Ahmed et al. |
| 2004/0148432 A1 | 7/2004 | Udono et al. |
| 2004/0172395 A1 | 9/2004 | Edelstein et al. |
| 2004/0255048 A1 | 12/2004 | Lev Ran et al. |
| 2005/0038819 A1 * | 2/2005 | Hicken et al. ............... 707/104.1 |
| 2005/0076098 A1 * | 4/2005 | Matsubara et al. ........... 709/219 |
| 2005/0114436 A1 * | 5/2005 | Betarbet ........................ 709/203 |
| 2005/0240295 A1 * | 10/2005 | Vilcauskas et al. ............. 700/94 |
| 2005/0287998 A1 | 12/2005 | Tonouchi |
| 2006/0075323 A1 * | 4/2006 | Singh et al. ................... 715/500 |
| 2006/0083171 A1 | 4/2006 | Tanaike et al. |
| 2006/0256771 A1 | 11/2006 | Yarlagadda |
| 2006/0259553 A1 | 11/2006 | Kawakita |
| 2006/0282540 A1 | 12/2006 | Tanimoto |
| 2007/0011095 A1 * | 1/2007 | Vilcauskas et al. ............. 705/51 |
| 2007/0022477 A1 | 1/2007 | Larson |
| 2007/0112772 A1 * | 5/2007 | Morgan et al. .................... 707/9 |
| 2007/0174428 A1 * | 7/2007 | Lev Ran et al. ............... 709/218 |
| 2007/0180079 A1 * | 8/2007 | Wei et al. ...................... 709/223 |
| 2007/0233844 A1 | 10/2007 | Tanimoto |
| 2007/0237139 A1 * | 10/2007 | Garcia-Martin et al. ..... 370/389 |
| 2007/0274329 A1 | 11/2007 | Takeyoshi et al. |
| 2008/0089349 A1 | 4/2008 | Tanimoto |
| 2008/0098088 A1 | 4/2008 | Tamano et al. |
| 2008/0126434 A1 * | 5/2008 | Uysal et al. ................... 707/201 |
| 2008/0137672 A1 | 6/2008 | Tanimoto |
| 2008/0288591 A1 | 11/2008 | Tanimoto |
| 2008/0298367 A1 | 12/2008 | Furukawa |
| 2009/0024717 A1 * | 1/2009 | Im .................................. 709/218 |
| 2009/0228423 A1 * | 9/2009 | Hicken et al. ................... 706/54 |

FOREIGN PATENT DOCUMENTS

| | | |
|---|---|---|
| JP | 56-025880 A | 3/1981 |
| JP | 61-225957 A | 10/1986 |
| JP | 04-105143 A | 4/1992 |
| JP | 09-168055 A | 6/1997 |
| JP | 09-214486 A | 8/1997 |
| JP | 09-282216 A | 10/1997 |
| JP | 10-069412 A | 3/1998 |
| JP | 10-116293 A | 5/1998 |
| JP | 10-126440 A | 5/1998 |
| JP | 10-177548 A | 6/1998 |
| JP | 11-234270 A | 8/1999 |
| JP | 11-313059 A | 11/1999 |
| JP | 2000-059465 A | 2/2000 |
| JP | 2000-99384 A | 4/2000 |
| JP | 2000-115167 A | 4/2000 |
| JP | 2001-014254 A | 1/2001 |
| JP | 2001-027978 A | 1/2001 |
| JP | 2001-092702 A | 4/2001 |
| JP | 2001-184289 A | 7/2001 |
| JP | 2001-292167 A | 10/2001 |
| JP | 2001-306382 A | 11/2001 |
| JP | 2002-007182 A | 1/2002 |
| JP | 2002-141952 A | 5/2002 |
| JP | 2002-149519 A | 5/2002 |
| JP | 2002-199150 A | 7/2002 |
| JP | 2002-217943 A | 8/2002 |
| JP | 2002-247036 A | 8/2002 |
| JP | 2002-288415 A | 10/2002 |
| JP | 2002-314573 A | 10/2002 |
| JP | 2003-6022 A | 1/2003 |
| JP | 2003-032310 A | 1/2003 |
| JP | 2003-288247 A | 10/2003 |
| JP | 2004-128597 A | 4/2004 |
| JP | 2004-133600 A | 4/2004 |
| JP | 2004-139291 A | 5/2004 |
| JP | 2004-201255 A | 7/2004 |
| JP | 2004-213533 A | 7/2004 |
| JP | 2004-228817 A | 8/2004 |
| JP | 2004-265415 A | 9/2004 |
| JP | 2004-310371 A | 11/2004 |
| JP | 2005-027040 A | 1/2005 |
| JP | 2005-086520 A | 3/2005 |
| JP | 2005-115943 A | 4/2005 |
| JP | 2005-157699 A | 6/2005 |
| JP | 2005-210352 A | 8/2005 |
| JP | 2005-267658 A | 9/2005 |
| JP | 2005-328239 A | 11/2005 |
| JP | 2006-033105 A | 2/2006 |
| JP | 2006-268138 A | 10/2006 |
| JP | 2006-337021 A | 12/2006 |
| JP | 2006-343943 A | 12/2006 |
| JP | 2007-104440 A | 4/2007 |
| JP | 2007-265135 A | 10/2007 |
| JP | 2007-267136 A | 10/2007 |
| JP | 2007-310508 A | 11/2007 |
| JP | 2008-098699 A | 4/2008 |
| JP | 2008-098888 A | 4/2008 |
| JP | 2008-148046 A | 6/2008 |
| JP | 2008-148125 A | 6/2008 |
| JP | 2008-148200 A | 6/2008 |
| JP | 2008-154101 A | 7/2008 |
| JP | 2008-306500 A | 12/2008 |
| JP | 2009-027652 A | 2/2009 |
| JP | 2009-163300 A | 7/2009 |
| JP | 2009-163302 A | 7/2009 |
| JP | 2009-252159 A | 10/2009 |
| JP | 2009-265919 A | 11/2009 |
| JP | 2010-178089 A | 8/2010 |
| JP | 2010-256989 A | 11/2010 |
| JP | 2010-267084 A | 11/2010 |
| JP | 2011-055452 A | 3/2011 |
| JP | 2011-055453 A | 3/2011 |
| JP | 2011-055454 A | 3/2011 |
| WO | 00/69140 A | 11/2000 |
| WO | 2006/090465 A1 | 8/2006 |

OTHER PUBLICATIONS

Tanimoto; "Relay Server, Communication System and Facsimile System"; U.S. Appl. No. 10/045,897, filed Jan. 10, 2002.

Tanimoto; "Relay Server for Relaying Communications Between Network Devices"; U.S. Appl. No. 10/114,720, filed Apr. 1, 2002.

Tanimoto; "Relay Server"; U.S. Appl. No. 10/114,963, filed Apr. 2, 2002.

Tanimoto; "Relay Server, Network Device, Communication System, and Communication Method"; U.S. Appl. No. 10/116,615, filed Apr. 2, 2002.

Masuda et al.; "Multicast Network Control for Streaming Data Broadcasting", IEICE Technical Report, vol. 100, No. 672; pp. 327-334; Mar. 9, 2001.

"An Old-Timer of Character Chat IRC"; Mac Fan Internet; vol. 4, No. 6; p. 33; Jun. 1999.

Tanimoto: "Relay-Server," U.S. Appl. No. 11/853,943, filed Sep. 12, 2007.

Tanimoto: "File Server Device," U.S. Appl. No. 11/862,654, filed Sep. 27, 2007.
Tanimoto: "Relay Server and Client Terminal," U.S. Appl. No. 11/953,351, filed Dec. 10, 2007.
Tanimoto: "Relay Server, Relay Communication System, and Communication Device," U.S. Appl. No. 11/944,495, filed Nov. 23, 2007.
Tanimoto: "Relay Server and Relay Communication System," U.S. Appl. No. 11/953,505, filed Dec. 10, 2007.
Tanimoto: "Relay Server and Relay Communication System," U.S. Appl. No. 12/103,933, filed Apr. 16, 2008.
Tanimoto: "Relay Server and Relay Communication System," U.S. Appl. No. 12/112,127, filed Apr. 30, 2008.
Tanimoto: "Relay Server and Relay Communication System," U.S. Appl. No. 12/107,793, filed Apr. 23, 2008.
Official communication issued in counterpart Japanese Application No. 2006-277372, mailed on Jul. 15, 2008.
Official communication issued in counterpart Japanese Application No. 2006-277246, mailed on Aug. 25, 2008.
Official communication issued in counterpart Japanese Application No. 2006-277372, mailed on Oct. 7, 2008.
Official communication issued in counterpart European Application No. 07018964.2, mailed on May 8, 2009.
Jin et al.: "Replica Based Distributed Metadata Management in Grid Enviroment," XP019033202; Computational Science- ICCS 2006 Lecture Notes in Computer Science; LNCS; http://www.springerlink.com/content/h2glt33m069677224/fulltext.pdf; vol. 3994; May 10, 2006; pp. 1055-1057.
Satyanarayanan: "A Survey of Distributed File Systems," XP002260895; Technical Report CMU-CS-89-116; Feb. 1, 1989; pp. 27 pages.
Thain et al.: "Separating Abstractions From Resources in a Tactical Storage System," XP010864894; Supercomputing, 2005; Proceedings of the ACM/IEEE SC 2005 Conference; Nov. 12, 2005; 12 pages.
Shinji Okumura et al., SIP (session initiation protocol), Nikkei Communications, Sep. 22, 2003, pp. 150-158 (partial translation pp. 155-156 (Usable in IM and Presence Notification)).
Tanimoto, "Relay Server and Relay Communication System," U.S. Appl. No. 12/270,883, filed Nov. 14, 2008.
Tanimoto, "Relay Server and Relay Communication System," U.S. Appl. No. 12/335,642, filed Dec. 16, 2008.
Tanimoto, "Relay Server and Relay Communication System," U.S. Appl. No. 12/335,661, filed Dec. 16, 2008.
Tanimoto: "Relay Server and Relay Communication System," U.S. Appl. No. 12/340,868, filed Dec. 22, 2008.
Official Communication issued in corresponding Japanese Patent Application No. 2007-339311, mailed on Apr. 8, 2011.
"Error & Warning Message Ways of Coping, Nikkei Personal Computer", Nikkei Business Publications, Inc., May 10, 2007.
Official Communication issued in corresponding European Patent Application No. 08007866.0, mailed on Apr. 19, 2011.
Official Communication issued in U.S. Appl. No. 11/723,466, mailed on Nov. 8, 2010.
Tanimoto; "Relay Device and Communication System"; U.S. Appl. No. 11/723,466, filed Mar. 20, 2007.
Official Communication issued in International Patent Application No. PCT/JP2010/001594, mailed on Mar. 30, 2010.
Official Communication issued in International Patent Application No. PCT/JP2010/003240, mailed on Jun. 15, 2010.
Official Communication issued in International Patent Application No. PCT/JP2010/005041, mailed on Nov. 22, 2010.
Official Communication issued in International Patent Application No. PCT/JP2010/005679, mailed on Oct. 26, 2010.
Official Communication issued in International Patent Application No. PCT/JP2010/005680, mailed on Oct. 26, 2010.
Hitoshi, "Network World", vol. 9, No. 12, Dec. 1, 2004, pp. 148-150.
Official Communication issued in corresponding Japanese Patent Application No. 2006-335512, mailed on Aug. 2, 2011.
Official Communication issued in corresponding Japanese Patent Application No. 2006-090693, mailed on Aug. 2, 2011.
English translation of Official Communication issued in corresponding Japanese Patent Application No. 2006-334652, mailed on Jun. 8, 2010.
English translation of Official Communication issued in corresponding Japanese Patent Application No. 2007-152122, mailed on Jun. 2, 2010.
Tanimoto, "Relay Server and Relay Communication System", U.S. Appl. No. 13/061,234, filed Feb. 28, 2011.
Tanimoto, "Relay Server, Relay Communication System, and Communication Apparatus", U.S. Appl. No. 13/061,725, filed Mar. 2, 2011.
Tanimoto, "First Relay Server and Second Relay Server", U.S. Appl. No. 13/255,958, filed Sep. 12, 2011.
Yamazaki, "P2P Network System", Japanese Society for Artificial Intelligence, vol. 16, No. 6, pp. 834-840, Nov. 1, 2001.
Official Communication issued in corresponding Japanese Patent Application No. 2006-277372, mailed on Dec. 7, 2010.
Official Communication issued in corresponding Japanese Patent Application No. 2009-205183, mailed on Feb. 3, 2012.
Official Communication issued in corresponding Japanese Patent Application No. 2009-205191, mailed on Feb. 3, 2012.
Official Communication issued in corresponding Japanese Patent Application No. 2009-201775, mailed on Feb. 7, 2012.
Tanimoto, "Relay Communication System and First Relay Server," U.S. Appl. No. 13/320,034, filed Nov. 11, 2011.
Tanimoto et al., "Relay Communication System and Access Management Apparatus," U.S. Appl. No. 13/390,561, filed Feb. 15, 2012.
Tanimoto, "Relay Server and Relay Communication System," U.S. Appl. No. 13/496,664, filed Mar. 16, 2012.
Tanimoto, "Relay Device and Communication System", U.S. Appl. No. 13/341,711, filed Dec. 30, 2011.
Tanimoto, "Relay Server and Relay Communication System Arranged to Share Resources Between Networks." U.S. Appl. No. 13/153,497, filed Jun. 6, 2011.

* cited by examiner

FILE TRANSFER SERVER

CROSS-REFERENCE TO RELATED APPLICATIONS

This application claims priority under 35 U.S.C 119 to Japanese Patent Application No. 2006-277246, filed on Oct. 11, 2006, and No. 2006-277372, filed on Oct. 11, 2006, which applications are hereby incorporated by reference in their entirety.

BACKGROUND OF THE INVENTION

1. Field of the Invention

The present invention relates to a technique of accessing files in different networks.

2. Description of Related Art

Use of a call control protocol such as a SIP (Session Initiation Protocol) or a DDNS (Dynamic Domain Name System) allows communication terminals on different LANs (Local Area Networks) to directly carry out communications with each other via a WAN (Wide Area Network). Such a technique is referred to as a so-called VPN (Virtual Private Network). According to this technique, remote LANs can be used as if an interconnection is effected therebetween.

For example, use of the technique effects a connection between a LAN in a head office and a LAN in a branch office, so that terminals on the respective LANs can carry out communications with each other via the Internet.

There has been known a technique of allowing communication terminals on different LANs to carry out communications with each other via the Internet. According to this technique, the communication terminals on the different LANs log in to relay servers connected to the Internet via gateways so as to establish communication paths to the relay servers, respectively. Through the communication paths, the communication terminals can carry out communications with each other via the Internet. That is, this technique allows communications between LANs via relay servers on a WAN.

There has been also known a technique of allowing shared use of files in different LANs. For example, a file can be shared between LANs provided on different floors in an office building. That is, an office worker in one floor refers to a network shared folder to access a file in a LAN located on another floor.

As described above, conventionally, a file can be shared between different LANs. However, various problems must be solved in order to safely share the file between the different LANs via the Internet. That is, there arise many problems in terms of security when information about a shared file is referred to as it is over the Internet. In order to solve the problems, therefore, a new mechanism must be prepared.

In addition, there arise problems in terms of practical use because a LAN has no mechanism to dynamically send information about a shared file to another LAN. More specifically, in order to allow share use of a file via the Internet, a first LAN must provide to a second LAN information about the file to be shared. However, if a file is newly added or the file to be shared is deleted, the first LAN cannot dynamically send information about the addition or the deletion to the second LAN. In addition, LANs are fixedly connected to each other in a conventional VPN. Consequently, the VPN has no mechanism to respond to such a dynamic change that specific LANs share a specific file or folder as necessary.

Further, a current file sharing system has a problem of a poor referring property if there are many folders or files to be shared. More specifically, if many folders or files are listed, a user cannot readily find a target folder or file.

BRIEF SUMMARY OF THE INVENTION

In order to solve the problems described above, preferred embodiments of the present invention provide a mechanism to safely and practically share a file via a wide area network such as the Internet, and provide a mechanism for dynamic shared use of a file such that a specific resource is shared between specific LANs as necessary. Also, preferred embodiments of the present invention provide a technique of allowing a user to access or refer to only a required folder or file on an individual basis.

In order to overcome the problems described above, a preferred embodiment of the present invention provides a file transfer server placed on a local area network to carry out communications with an external server on a wide area network. The file transfer server includes a list preparation section, a registration section and a list exchange section. The list preparation section collects file information in the local area network to prepare a file list. The registration section registers account information of the file transfer server in the external server. The list exchange section designates another file transfer server registered in the external server to exchange file lists with the another file transfer server via the external server. Herein, a communication terminal on the local area network issues to the file transfer server a request to acquire a file in the exchanged file list. Upon receipt of the request, the file transfer server specifies a file transfer server in which the designated file is registered, and establishes a relaying communication session with the specified file transfer server. Then, the file transfer server issues to the specified file transfer server a request to acquire the file.

In a preferred embodiment of the present invention, the list exchange section includes a designation section. The designation section allows the another file transfer server to transfer an updated file list when contents of the file list are changed.

In a preferred embodiment of the present invention, the list preparation section includes an update section. The update section regularly refers to a folder in the local area network, and automatically updates the file list when a file configuration in the folder is changed.

Preferred embodiments of the present invention also provide a file transfer server placed on a local area network to carry out communications with an external server on a wide area network. The file transfer server includes a list preparation section, a registration section, an acquisition section, a memory section and a provision section. The list preparation section collects file information in the local area network to prepare a file list. The registration section registers account information of the file transfer server in the external server. The acquisition section acquires a file list, via the external server, from another file transfer server designated by a communication terminal on the local area network and registered in the external server. The memory section stores therein the acquired file list while bringing the file list into correspondence with the communication terminal which issues a request to acquire a file in the file list. The provision section receives a request to refer to the file list from the communication terminal on the local area network, and provides the file list brought into correspondence with the communication terminal which issues the request.

In a preferred embodiment of the present invention, the file transfer server receives from the communication terminal on the local area network the request to acquire the file in the file list brought into correspondence with the communication terminal. Then, the file transfer server establishes a relaying communication session with the another file transfer server in which the designated file is registered, and issues to the another file transfer server a request to acquire the designated file.

Preferred embodiments of the present invention also provide a file transfer server placed on a local area network to carry out communications with an external server on a wide area network. The file transfer server includes a list preparation section, a registration section, an acquisition section and a provision section. The list preparation section collects file information in the local area network to prepare a file list. The registration section registers account information of the file transfer server in the external server. The acquisition section receives a command to retrieve a file from a communication terminal on the local area network, and acquires the file list, via the external server, from another file transfer server which is registered in the external server and which is designated by the communication terminal or is set previously. When the file to be retrieved is contained in the acquired file list, the provision section provides the file list to the communication terminal which issues the command.

In a preferred embodiment of the present invention, the file transfer server receives a request to acquire the retrieved file from the communication terminal on the local area network, establishes a relaying communication session with the file transfer server in which the designated file is registered, and issues a request to acquire the designated file to the file transfer server.

The file transfer server according to a preferred embodiment of the present invention prepares a list of files in a local area network, and exchanges file lists with another file transfer server registered in an external server. Then, the file transfer server receives a request to access the file in the file list from a communication terminal, specifies the another file transfer server, and acquires the relevant file from the specified another file transfer server. Thus, files can be shared via a wide area network, and a communication terminal on one local area network can acquire a file in another local area network. Further, a file list is stored in a file transfer server on a local area network and, therefore, has no problems in terms of security. Unlike a conventional system using a fixed VPN, a required folder or file can be shared between given file transfer servers as necessary.

If contents of a file list are changed, the file transfer server according to various preferred embodiments of the present invention transfers an updated file list to another file transfer server. Therefore, it is possible to refer to latest information about a file shared between different local area networks. Thus, it is possible to allow practical shared use of a file via a wide area network.

Moreover, the file transfer server according to various preferred embodiments of the present invention regularly refers to a folder registered in a local area network to automatically update a file list. Therefore, it is possible to constantly maintain the most up to date status of a file list to be exchanged.

Moreover, the file transfer server according to various preferred embodiments of the present invention receives a file list from another file transfer server designated by a communication terminal, and administers the file list while bringing the file list into correspondence with the communication terminal. Thus, a communication terminal on one LAN can acquire a file in another LAN via the Internet. A file list is administered by a file transfer server which has received the file list and, therefore, has no problems in terms of security. Further, a file list is administered while being brought into correspondence with a communication terminal which intends to acquire the file list; therefore, each communication terminal can acquire a dedicated file list. That is, each communication terminal can specially use a shared list to which the communication terminal frequently refers.

Moreover, the file transfer server according to various preferred embodiments of the present invention receives a request to retrieve a file from a communication terminal, acquires a file list from another file transfer server, and provides a result of the retrieval to the communication terminal. Thus, a communication terminal on one LAN can use a file retrieved from another LAN via the Internet.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Figure 1:
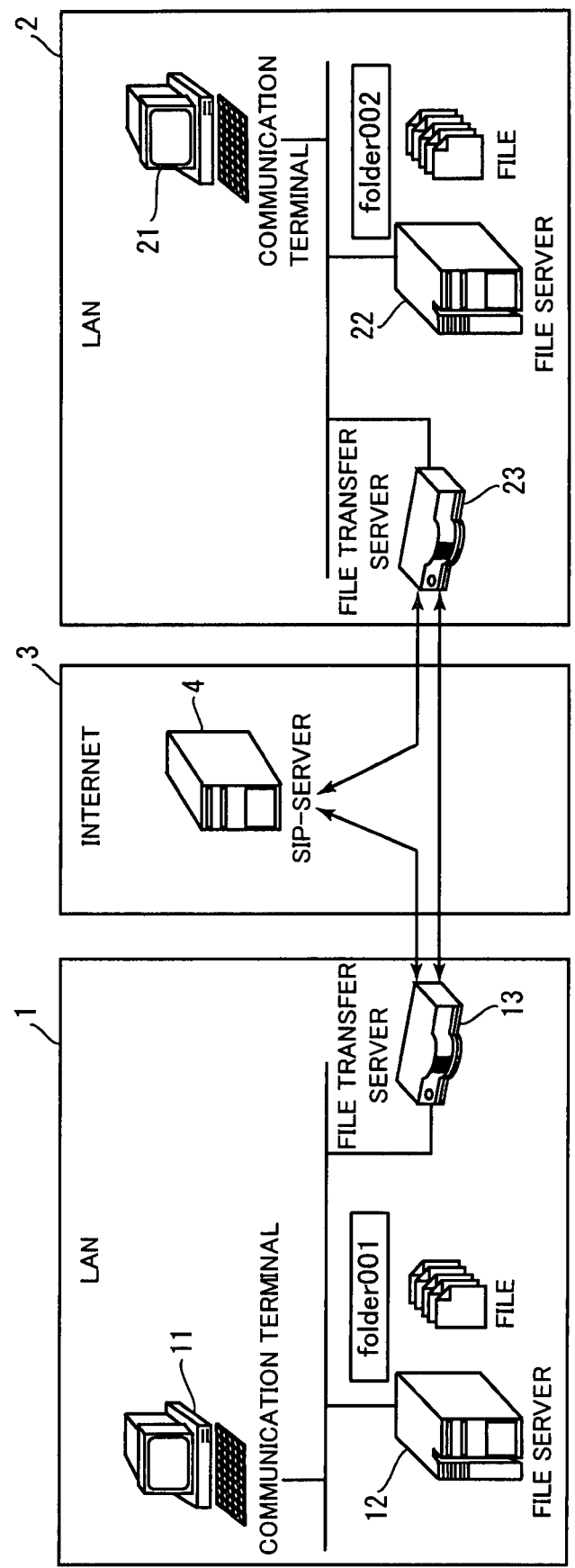
FIG. 1 illustrates a network configuration of a communication system according to a first preferred embodiment of the present invention.

Hereinafter, description will be given of a first preferred embodiment of the present invention with reference to the drawings. FIG. 1 illustrates a general configuration of a communication system according to the first preferred embodiment. The communication system preferably includes the Internet 3 and two local area networks (LANs) 1, 2 each connected to the Internet 3. The LANs 1 and 2 are located at physically remote places, respectively. For example, the LAN 1 corresponds to a local network located at a head-office building, and the LAN 2 corresponds to a local network located at a branch-office building. Each of the LANs 1 and 2 is connected to the Internet 3 which is a global network.

As illustrated in FIG. 1, a communication terminal 11 and a file server 12 are connected to the LAN 1. Each of the communication terminal 11 and the file server 12 has a private IP address. As described above, typically, a terminal connected to a LAN has a private IP address which is uniquely administered only in the LAN. Further, a file transfer server 13 is connected to the LAN 1. The file transfer server 13 is not only connected to the LAN 1, but is also connected to the Internet 3. The file transfer server 13 has a private IP address for a LAN interface and a global IP address for a WAN interface.

On the other hand, a communication terminal 21 and a file server 22 each having a private IP address are connected to the LAN 2. Further, a file transfer server 23 is connected to the LAN 2. The file transfer server 23 is not only connected to the LAN 2, but is also connected to the Internet 3. The file transfer server 23 has a private IP address for a LAN interface and a global IP address for a WAN interface.

Further, a SIP server 4 is connected to the Internet 3. The SIP server 4 serves as a proxy server for relaying a SIP method and a response when the file transfer servers 13 and 23 carry out communications through a SIP (Session Initiation Protocol), and serves as a SIP registrar server for registering therein accounts of the file transfer servers 13 and 23.

Figure 2:
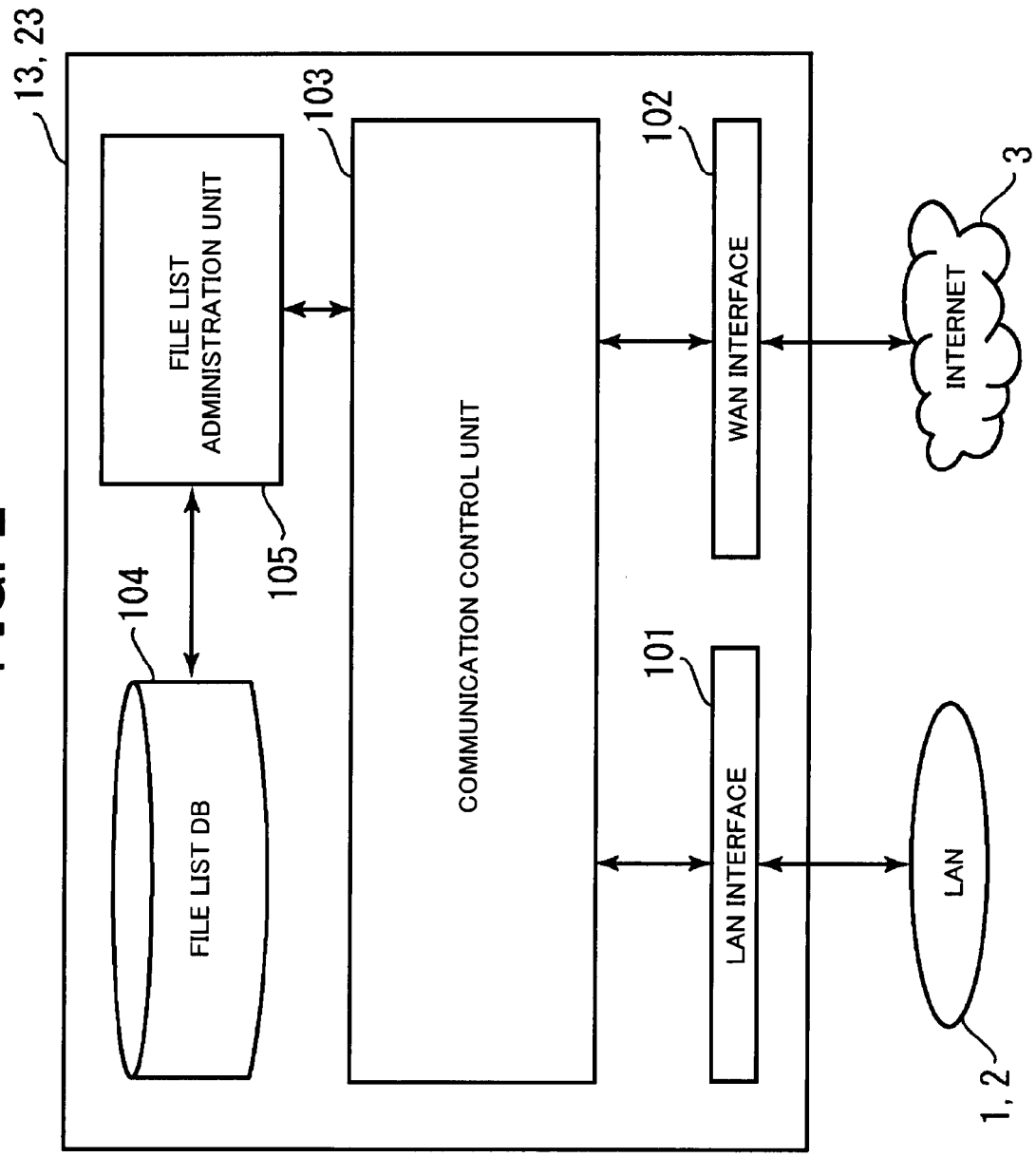
FIG. 2 illustrates a functional block diagram of a file transfer server.

FIG. 2 illustrates a functional block diagram of the file transfer servers 13 and 23. Herein, the file transfer servers 13 and 23 are preferably similar in function to each other; therefore, description thereof will be given with reference to the single drawing. Each of the file transfer servers 13 and 23 preferably includes a LAN interface 101, a WAN interface 102, a communication control unit 103, a file list database 104 and a file list administration unit 105.

The LAN interface 101 uses the private IP address to carry out communications with the terminal connected to the LAN. That is, the file transfer server 13 carries out communications with the communication terminal 11 and the file server 12 through the LAN interface 101, and the file transfer server 23 carries out communications with the communication terminal 21 and the file server 22 through the LAN interface 101.

The WAN interface 102 uses the global IP address to carry out communications with the SIP server 4 connected to the Internet 3 which is a global network as well as other communication servers and communication terminals each connected to the Internet 3. In the first embodiment, the file transfer server includes the WAN interface. Alternatively, a connection with a wide area network (WAN) may be established through a router, and the file transfer server may be placed under control of the router.

The communication control unit 103 controls various communications carried out through the LAN interface 101 and the WAN interface 102. Herein, the communication control unit 103 controls various types of communication processing according to protocols such as a TCP/IP (Transmission Control Protocol/Internet Protocol), a UDP (User Datagram Protocol) and a SIP.

The communication control unit 103 issues to the SIP server 4 a request (REGISTER) to register the account of the file transfer server itself.

The communication control unit 103 also allows the file transfer servers 13 and 23 to carry out communications with each other by establishment of a media session between the file transfer servers 13 and 23. That is, when one of the file transfer servers 13 and 23 sends an INVITE method of the SIP to the other file transfer server, the media session can be established between the file transfer servers 13 and 23. The communication control units 103 of the file transfer servers 13 and 23 allow the file transfer servers 13 and 23 to carry out data communications with each other through the established media session.

The file list administration unit 105 administers a list of files shared in the LAN. The file list administration unit 105 accesses the file server to prepare the list of the files shared in the LAN. In addition, the file list administration unit 105 can register therein a specific shared folder in the file server. Thus, the file list administration unit 105 regularly monitors the shared folder registered therein, and automatically updates the file list when a file is added to the folder or the file is deleted from the folder. For example, the file list administration unit 105 of the file transfer server 13 regularly accesses the file server 12, prepares a list of shared files accumulated in the file server 12, and stores the file list in the file list database 104.

Moreover, the file list administration unit 105 allows the file transfer servers to exchange the file lists with each other. The file transfer servers 13 and 23 use a SUBSCRIBE method of the SIP to exchange the file lists with each other. That is, the first file transfer server sends the SUBSCRIBE method to the second file transfer server. Upon receipt of the SUBSCRIBE method, the second file transfer server sends to the first file transfer server the file list stored in the file list database 104 thereof, that is, the list of the files shared in the LAN to which the second file transfer server is connected. Upon receipt of the file list, then, the first file transfer server stores the file list in the file list database 104 while bringing the file list into correspondence with the account of the second file transfer server.

For example, when the file transfer server 13 sends the SUBSCRIBE method to the file transfer server 23, the file transfer server 23 transfers the list of the files shared in the LAN 2 to the file transfer server 13. Then, the file transfer server 13 stores the received file list in the file list database 104 while bringing the file list into correspondence with the account of the file transfer server 23.

The second file transfer server receives a request to send the file list from the first file transfer server by the SUBSCRIBE method. Thereafter, if the file list is updated, the second file transfer server continuously sends to the first file transfer server a notification about the update of the file list and a latest file list. That is, the file transfer server, which receives a request to send a file list, is designed to constantly send a latest file list to the file transfer server, which issues the request, each time the file list is updated.

Figure 3:
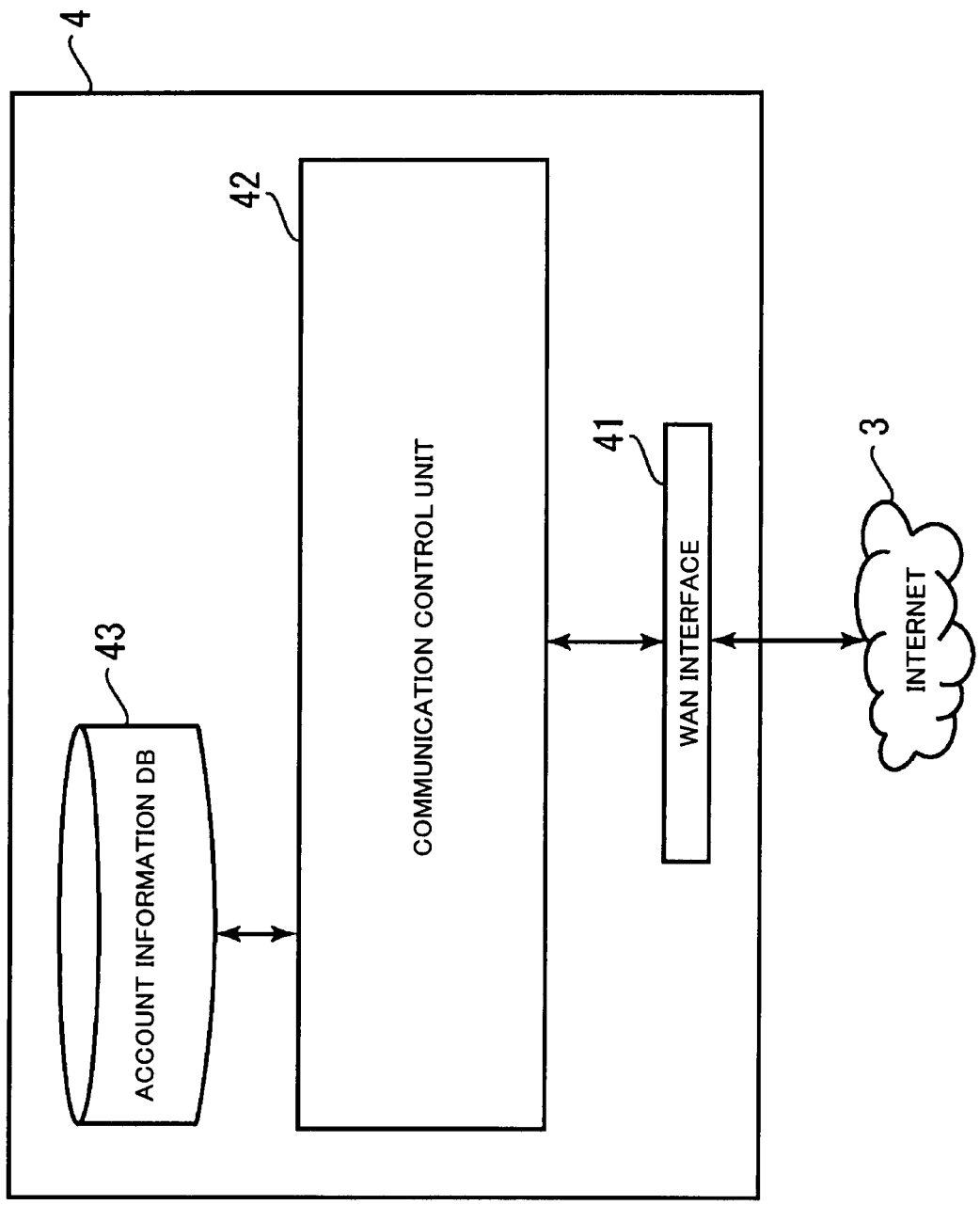
FIG. 3 illustrates a functional block diagram of a SIP server.

FIG. 3 illustrates a functional block diagram of the SIP server 4. As illustrated in FIG. 3, the SIP server 4 includes a WAN interface 41, a communication control unit 42 and an account information database 43.

The WAN interface 41 uses the global IP address to carry out communications with the server and the terminal each connected to the Internet 3. The SIP server 4 can carry out communications with the file transfer servers 13 and 23 through the WAN interface 41.

The communication control unit 42 controls various communications carried out through the WAN interface 41. The communication control unit 42 controls communication processing according to a protocol such as a TCP/IP, a UDP or a SIP.

The communication control unit 42 receives an account registration request (REGISTER) from the file transfer server connected to the Internet 3, and registers account information of the file transfer server in the account information database 43. For example, the SIP server 4 receives the account registration request (REGISTER) from the file transfer server 13, and registers the account information of the file transfer server 13 in the account information database 43.

The communication control unit 42 also relays various types of communication data such as a SIP method and a response from one of the file transfer servers 13 and 23 to the other file transfer server.

Figure 4:
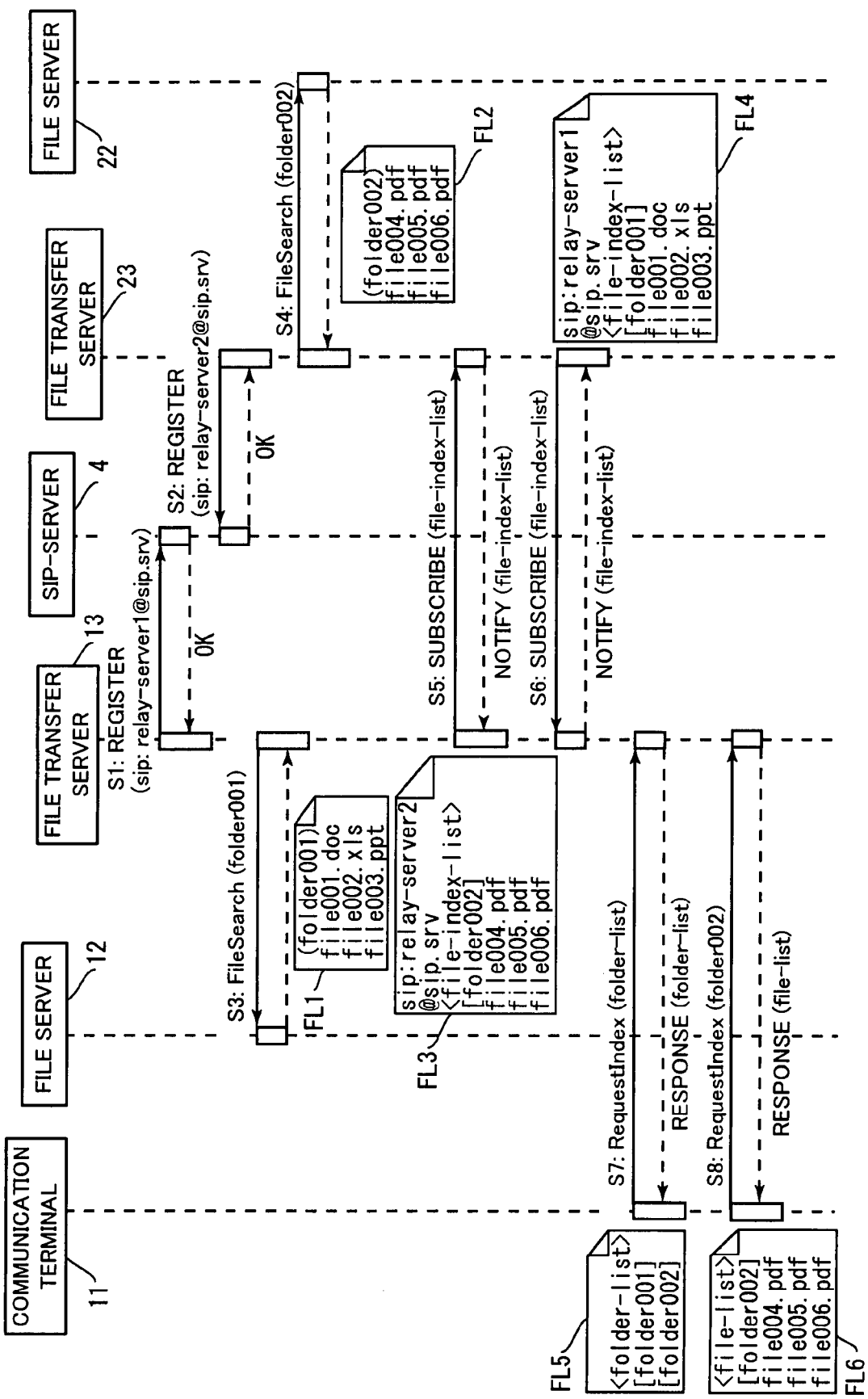
FIG. 4 illustrates a sequence of communication processing.
Figure 5:
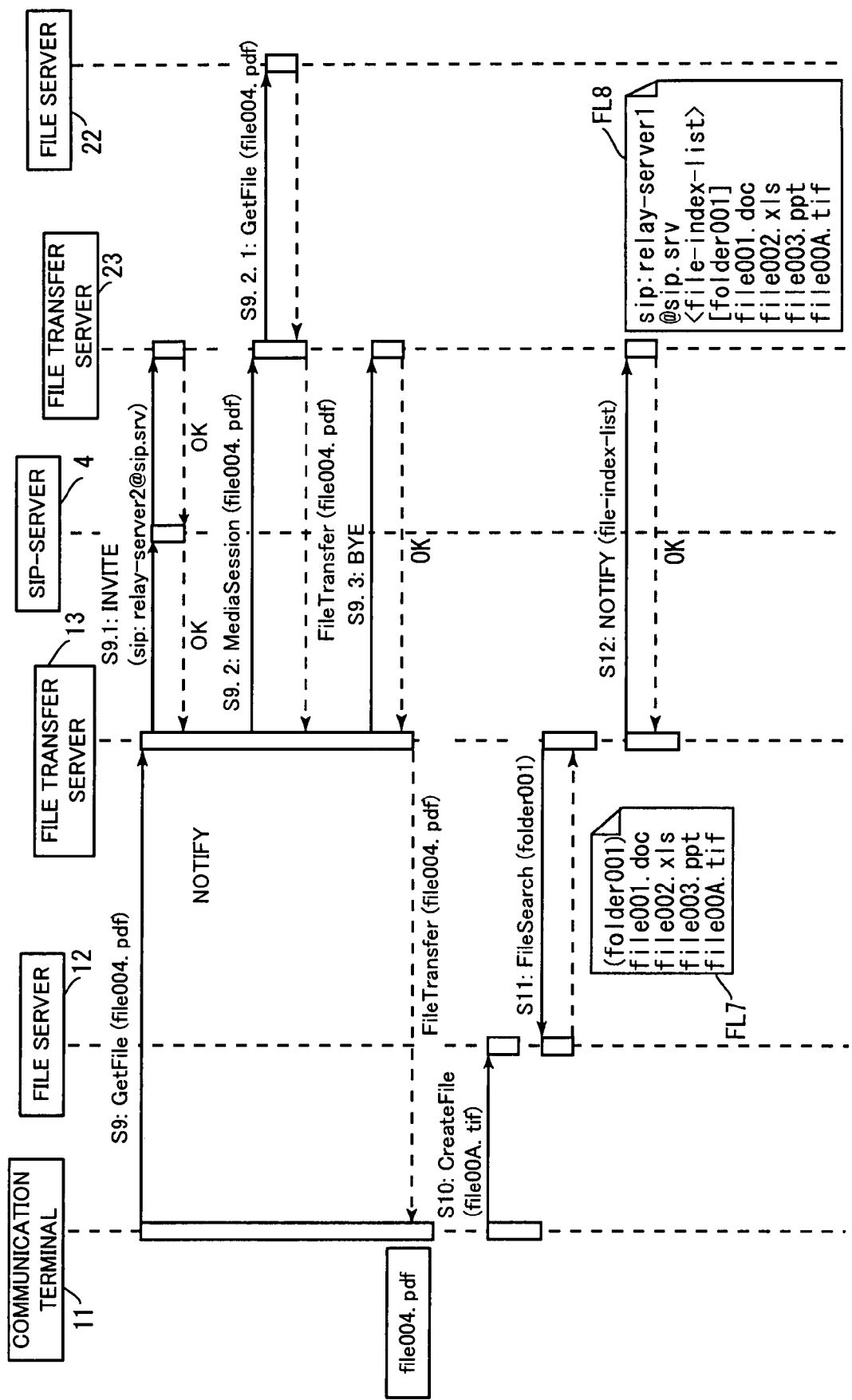
FIG. 5 illustrates a sequence of the communication processing.

With reference to processing sequence diagrams in FIGS. 4 and 5, next, description will be given of a flow of the communication processing in the communication system configured as described above. Herein, FIG. 4 illustrates a sequence from step S1 to step S8, and FIG. 5 illustrates a sequence from step S9, which is subsequent to step S8, to step S12.

First, the file transfer server 13 issues an account registration request (REGISTER) to the SIP server 4 (step S1). As illustrated in FIG. 4, herein, the file transfer server 13 makes a request to register an account (SIP:relay-server1@sip.srv) thereof. The SIP server 4 sends an OK response back to the file transfer server 13, and registers the account of the file transfer server 13 in the account information database 43 while bringing the account into correspondence with the global IP address of the file transfer server 13. In order to perform user authentication through a password, the password is previously registered in the account information database 43 while being brought into correspondence with the account of the file transfer server. In this case, a user sends the password upon receipt of a request to register the password. If the authentication is successfully performed, the account is registered while being brought into correspondence with the IP address.

Successively, the file transfer server 23 issues an account registration request (REGISTER) to the SIP server 4 (step S2). As illustrated in FIG. 4, herein, the file transfer server 23 makes a request to register an account (SIP:relay-server2@sip.srv) thereof. The SIP server 4 sends an OK response back to the file transfer server 23, and registers the account of the file transfer server 23 in the account information database 43 while bringing the account into correspondence with the global IP address of the file transfer server 23. Herein, user authentication through a password may be performed as in the aforementioned manner.

Next, the file transfer server 13 accesses the file server 12 to perform file search (step S3). As a target for the file search, herein, a shared folder (folder001) in the file server 12 is registered in the file transfer server 13. Therefore, the file transfer server 13 performs the file search on the shared folder (folder001). Further, a required folder or file can be shared as necessary if a client enables to optionally register or delete the shared folder. As a result of the file search, then, a file list FL1 is sent to the file transfer server 13. As illustrated in FIG. 4, the file list FL1 shows that the shared folder (folder001) contains three files (file001.doc, file002.xls, file003.ppt). The file transfer server 13 stores the received file list FL1 in the file list database 104 thereof.

Next, the file transfer server 23 accesses a shared folder (folder002) in the file server 22 to perform file search (step S4). That is, the shared folder (folder002) in the file server 22 is registered in the file transfer server 23. As illustrated in FIG. 4, a file list FL2 sent from the file server 22 shows that the shared folder (folder002) contains three files (file004.pdf, file005.pdf, file006.pdf). The file transfer server 23 stores the received file list FL2 in the file list database 104 thereof.

Next, the file transfer server 13 issues a file list transfer request (SUBSCRIBE) to the file transfer server 23 (step S5). In response thereto, the file transfer server 23 sends a file list to the file transfer server 13 by a NOTIFY method. In other words, the file transfer server 23 sends the list of the files shared in the LAN 2. Upon receipt of the file list, the file transfer server 13 stores the file list in the file list database 104 while bringing the file list into correspondence with the account (SIP:relay-server2@sip.srv) of the file transfer server 23. As illustrated in FIG. 4, the list of the files contained in the shared folder (folder002) and the account of the file transfer server 23 are described in the stored file list FL3 while being brought into correspondence with each other.

Successively, the file transfer server 23 issues a file list transfer request (SUBSCRIBE) to the file transfer server 13 (step S6). Then, the file transfer server 13 sends to the file transfer server 23 the list of the files shared in the LAN 1. The file transfer server 23 stores in the file list database 104 a file list FL4 in which the list and the account (SIP:relay-server1@sip.srv) of the file transfer server 13 are brought into correspondence with each other.

As described above, the first file transfer server sends the SUBSCRIBE method to the second file transfer server to issue the request to transfer the file list. Upon receipt of the request, then, the second file transfer server continuously sends a notification about update of the file list and a latest file list to the first file transfer server. That is, when a file shared in the LAN, to which one file transfer server is connected, is subjected to addition or deletion, the file transfer server sends update information of the file to another file transfer server.

Next, the communication terminal 11 accesses the file transfer server 13 to issue a folder list referring request (step S7). Upon receipt of the request, the file transfer server 13 transfers a folder list FL5 to the communication terminal 11. Herein, the file transfer server 13 sends to the communication terminal 11 the folder list FL5 in which two folder names of the folder (folder001) shared in the LAN 1 and the folder (folder002) shared in the LAN 2 are described.

Successively, the communication terminal 11 issues to the file transfer server 13 a request to refer to file information of the shared folder (folder002) (step S8). Upon receipt of the request, the file transfer server 13 sends to the communication terminal 11 a file list FL6 of the shared folder (folder002) stored in the file list database 104. That is, the file transfer server 13 sends to the communication terminal 11 the file list transferred from the file transfer server 23.

As described above, the file transfer server 13 and the file transfer server 23 exchange the file lists with each other. Thus, the terminals connected to the LANs access the file transfer servers 13 and 23, thereby referring to the exchanged folder lists and file lists, respectively.

Next, the communication terminal 11 issues to the file transfer server 13 a request to acquire the file (file004.pdf) contained in the file list to which the communication terminal 11 refers (step S9).

Upon receipt of the request, the file transfer server 13 checks a file transfer server from which the file list having the target file registered therein is acquired. In this example, the file (file004.pdf) is registered in the file list acquired from the file transfer server 23; therefore, the file transfer server 13 specifies the file transfer server 23 as a source of the requested file.

Next, the file transfer server 13 issues to the SIP server 4 a connection request command (INVITE method) addressed to the file transfer server 23 specified as the source of the requested file (step S9.1). This INVITE method designates the account (SIP:relay-server2@sip.srv) of the file transfer server 23 which receives the connection request. The SIP server 4 refers to the account information database 43, thereby acquiring the global IP address of the file transfer server 23. Then, the SIP server 4 relays the INVITE method from the file transfer server 13 to the file transfer server 23.

Thus, when the file transfer server 13 issues the connection request command to the file transfer server 23, the file transfer server 23 transfers an OK response to the file transfer server 13 via the SIP server 4. Then, a media session is established between the file transfer servers 13 and 23 by the acceptance of the connection request command (step S9.2).

When the media session is established, the file transfer server 13 issues a file acquisition command to the file transfer server 23. In accordance with this command, the file transfer server 23 acquires the file from the file server 22 (step S9.2.1). That is, the file transfer server 23 acquires the file (file004.pdf) stored in the shared folder (folder002) in the file server 22. Then, the file transfer server 23 transfers the file acquired from the file server 22 to the file transfer server 13 through the media session.

Upon receipt of the file from the file transfer server 23, the file transfer server 13 issues a session end request (BYE) to the file transfer server 23 (step S9.3). Thus, the media session between the file transfer servers is disconnected.

The file transfer server 13 receives the file (file004.pdf) from the file transfer server 23, and then sends the file (file004.pdf) to the communication terminal 11. Thus, the communication terminal 11 on the LAN 1 can acquire the file shared in the remote LAN 2. In the foregoing description, communications between the communication terminal 11 and the file transfer server 13 and communications between the file transfer server 23 and the file server 22 may be carried out through a protocol such as an NFS (Network File System) or an SMB (Server Message Block).

Next, description will be given of file list update processing. At a different timing, the communication terminal 11 stores a new shared file (file00A.tif) in the folder (folder001) in the file server 12 (step S10).

On the other hand, as described above, the file transfer server 13 regularly accesses the file server 12 to monitor the shared folder (folder001). As illustrated in FIG. 5, at a certain timing, the file transfer server 13 performs a file search on the shared folder (folder001) in the file server 12 (step S11). In response thereto, the file server 12 sends an updated file list FL7 to the file transfer server 13. Herein, the file (file00A.tif) additionally stored in step S10 is added to the file list FL7.

Further, the file transfer server 13 receives the SUBSCRIBE method from the file transfer server 23 in step S6, and therefore sends a notification about the update of the file list and a latest file list to the file transfer server 23 by the NOTIFY method (step S12).

The file transfer server 23 receives the updated file list from the file transfer server 13, stores the file list in the file list database 104, and updates the file list. A file list FL8 obtained by the update is illustrated in FIG. 5. As described above, when list information of a shared file is updated in one remote LAN, update information of the shared file is dynamically sent to another LAN. Accordingly, a system in which files are shared via the Internet can constantly keep a file list at a latest state.

According to a preferred embodiment of the present invention, as described above, files can be shared between remote LANs via the Internet. An exchanged file list has no problems in terms of security because of the following reason. That is, the file list is stored in a file transfer server on a LAN and, therefore, is not referred to by an external device. In other words, a communication terminal on a first LAN does not directly refer to a list of files shared in a second LAN, but refers to the file list obtained from exchange by a file transfer server. Thus, the communication terminal can use the files in the second LAN as if the files are shared between the two LANs. When the communication terminal selects a desired file from the file list, the file transfer server acquires the file through a media session. Therefore, the communication terminal can access a file in a remote LAN. Further, even when the list of the files shared in the remote LAN is dynamically changed, the communication terminal can refer to a latest file list constantly, which is effective in terms of practical use.

In the first preferred embodiment, the file transfer servers 13 and 23 are connected to each other so as to send a SUBSCRIBE method to each other in steps S5 and S6. Herein, a file transfer server to be connected may be preset. Alternatively, a command to connect/disconnect between the file transfer servers may be optionally supplied from a client. In any case, a file list can be prepared and updated automatically. Unlike a conventional system using a fixed VPN, the use of the file transfer server according to a preferred embodiment of the present invention allows shared use of a required folder or file between given file transfer servers as necessary.

Second Preferred Embodiment

Figure 6:
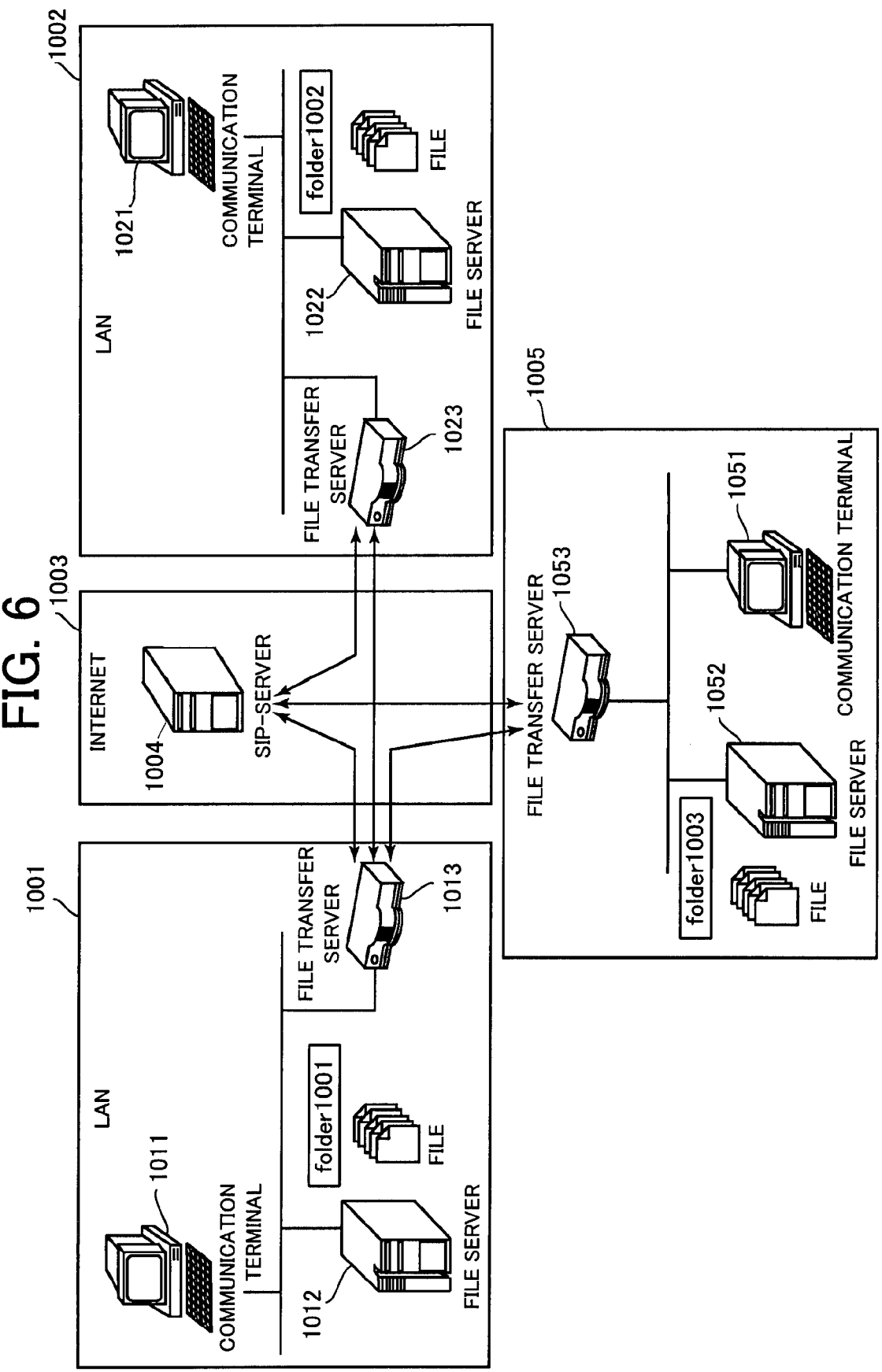
FIG. 6 illustrates a network configuration of a communication system according to a second preferred embodiment of the present invention.

Hereinafter, description will be given of a second preferred embodiment of the present invention with reference to the drawings. FIG. 6 illustrates a general configuration of a communication system according to the second preferred embodiment. The communication system preferably includes the Internet 1003 and three LANs 1001, 1002, 1005 each connected to the Internet 1003. The LANs 1001, 1002 and 1005 are preferably located at physically remote places, respectively. For example, the LAN 1001 corresponds to a local network located at a head-office building, and each of the LANs 1002 and 1005 corresponds to a local network located at a branch-office building. Each of the LANs 1001, 1002 and 1005 is connected to the Internet 1003 which is a global network.

As illustrated in FIG. 6, a communication terminal 1011 and a file server 1012 are connected to the LAN 1001. Each of the communication terminal 1011 and the file server 1012 has a private IP address. As described above, typically, a terminal connected to a LAN has a private IP address which is uniquely administered only in the LAN. Further, a file transfer server 1013 is connected to the LAN 1001. The file transfer server 1013 is not only connected to the LAN 1001, but is also connected to the Internet 1003. The file transfer server 1013 has a private IP address for a LAN interface and a global IP address for a WAN interface.

On the other hand, a communication terminal 1021 and a file server 1022 each having a private IP address are connected to the LAN 1002. Further, a file transfer server 1023 is connected to the LAN 1002. The file transfer server 1023 is not only connected to the LAN 1002, but is also connected to the Internet 1003. The file transfer server 1023 has a private IP address for a LAN interface and a global IP address for a WAN interface. Likewise, a communication terminal 1051, a file server 1052 and a file transfer server 1053 are connected to the LAN 1005.

Further, a SIP server 1004 is connected to the Internet 1003. The SIP server 1004 serves as a proxy server for relaying a SIP method and a response when the file transfer servers 1013, 1023 and 1053 carry out communications through a SIP, and serves as a SIP registrar server for registering therein accounts of the file transfer servers 1013, 1023 and 1053.

Figure 7:
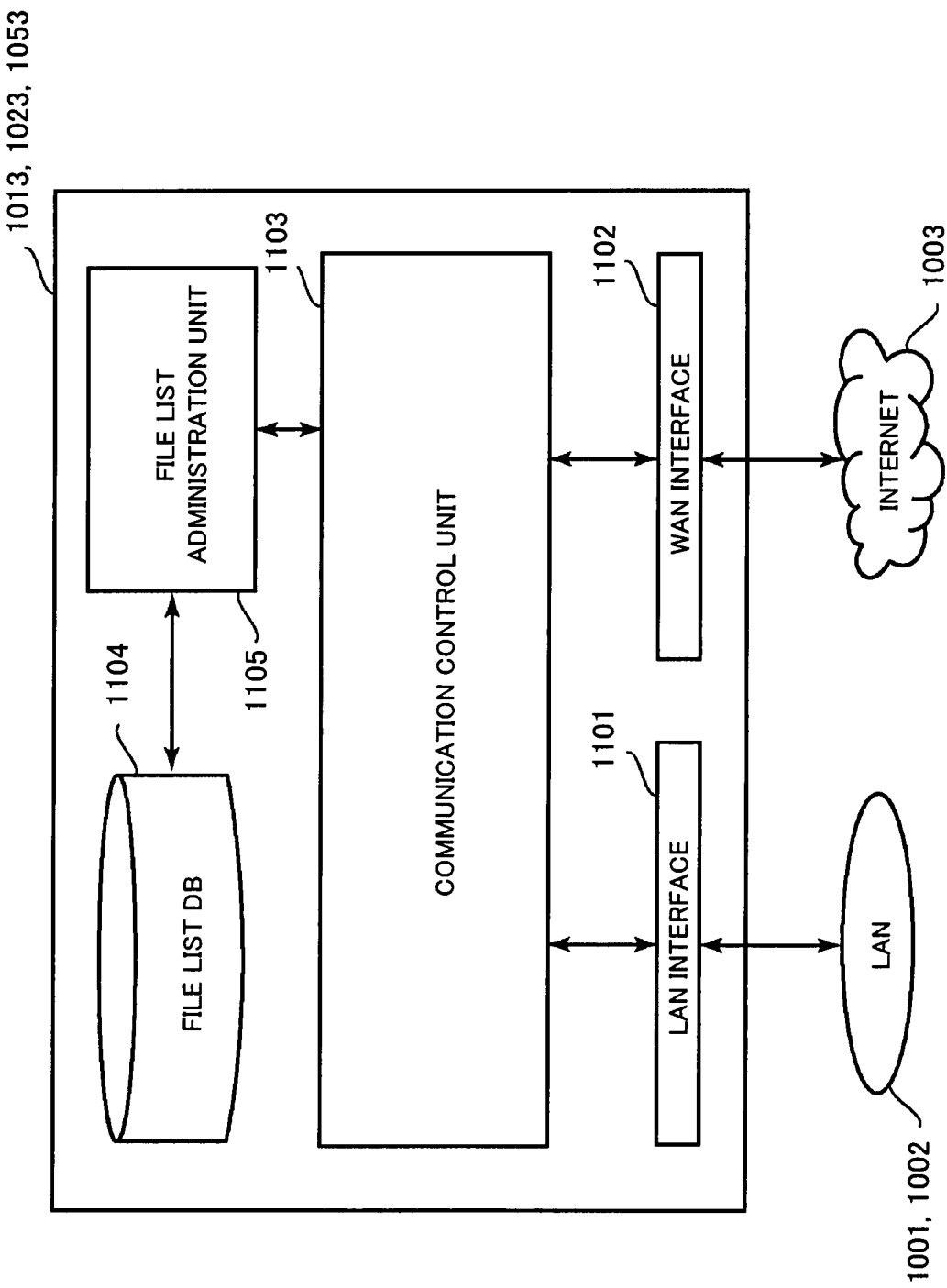
FIG. 7 illustrates a functional block diagram of a file transfer server.

FIG. 7 illustrates a functional block diagram of the file transfer servers 1013, 1023 and 1053. Herein, the file transfer servers 1013, 1023 and 1053 are preferably similar in function to each other; therefore, description thereof will be given with reference to the single drawing. Each of the file transfer servers 1013, 1023 and 1053 preferably includes a LAN interface 1101, a WAN interface 1102, a communication control unit 1103, a file list database 1104 and a file list administration unit 1105.

The LAN interface 1101 uses the private IP address to carry out communications with the terminal connected to the LAN. That is, the file transfer server 1013 carries out communications with the communication terminal 1011 and the file server 1012 through the LAN interface 1101, and the file transfer server 1023 or 1053 carries out communications with the communication terminal 1021 or 1051 and the file server 1022 or 1052 through the LAN interface 1101.

The WAN interface 1102 uses the global IP address to carry out communications with the SIP server 1004 connected to the Internet 1003 which is a global network as well as other communication servers and communication terminals each connected to the Internet 1003. In the second preferred embodiment, the file transfer server preferably includes the WAN interface. Alternatively, a connection with a WAN may be established through a router, and the file transfer server may be placed under control of the router.

The communication control unit 1103 controls various communications carried out through the LAN interface 1101 and the WAN interface 1102. Herein, the communication control unit 1103 controls various types of communication processing according to protocols such as a TCP/IP, a UDP and a SIP.

The communication control unit 1103 issues to the SIP server 1004 a request (REGISTER) to register the account of the file transfer server itself.

The communication control unit 1103 also allows two of the file transfer servers 1013, 1023 and 1053 to carry out communications with each other by establishment of a media session between the two of the file transfer servers 1013, 1023 and 1053. That is, when one file transfer server sends an INVITE method of the SIP to another file transfer server, the media session can be established between the file transfer servers. The communication control units 1103 of the file transfer servers 1013, 1023 and 1053 allow the file transfer servers 1013, 1023 and 1053 to carry out data communications with each other through the established media session.

The file list administration unit 1105 administers a list of files shared in the LAN. The file list administration unit 1105 accesses the file server to prepare the list of the files shared in the LAN. In addition, the file list administration unit 1105 can register therein a specific shared folder in the file server. Thus, the file list administration unit 1105 regularly monitors the shared folder registered therein, and automatically updates the file list when a file is added to the folder or the file is deleted from the folder. For example, the file list administration unit 1105 of the file transfer server 1013 regularly accesses the file server 1012, prepares a list of shared files accumulated in the file server 1012, and stores the file list in the file list database 1104.

Moreover, the file list administration unit 1105 receives a designation from the communication terminal connected to the LAN, and acquires the file list from the another file transfer server. The file transfer servers 1013, 1023 and 1053 use a SUBSCRIBE method of the SIP to acquire the file list. That is, the first file transfer server sends the SUBSCRIBE method to the second file transfer server. Upon receipt of the SUBSCRIBE method, the second file transfer server sends to the first file transfer server the file list stored in the file list database 1104 thereof, that is, the list of the files shared in the LAN to which the second file transfer server is connected. Upon receipt of the file list, then, the first file transfer server stores the file list in the file list database 1104 while bringing the file list into correspondence with the account of the second file transfer server and the account of the communication terminal which issues the request to acquire the file list.

For example, it is assumed herein that the communication terminal 1011 makes the file list acquisition request so as to designate the file transfer server 1023. In this case, when the file transfer server 1013 sends the SUBSCRIBE method to the file transfer server 1023, the file transfer server 1023 transfers the list of the files shared in the LAN 1002 to the file transfer server 1013. Then, the file transfer server 1013 stores the received file list in the file list database 1104 while bringing the file list into correspondence with the account of the file transfer server 1023 and the account of the communication terminal 1011.

Conversely, the second file transfer server receives a request to send the file list from the first file transfer server by the SUBSCRIBE method. Thereafter, if the file list is updated, the second file transfer server continuously sends to the first file transfer server a notification about the update of the file list and a latest file list. That is, the file transfer server, which receives a request to send a file list, is designed to constantly send a latest file list to the file transfer server, which issues the request, each time the file list is updated.

Figure 8:
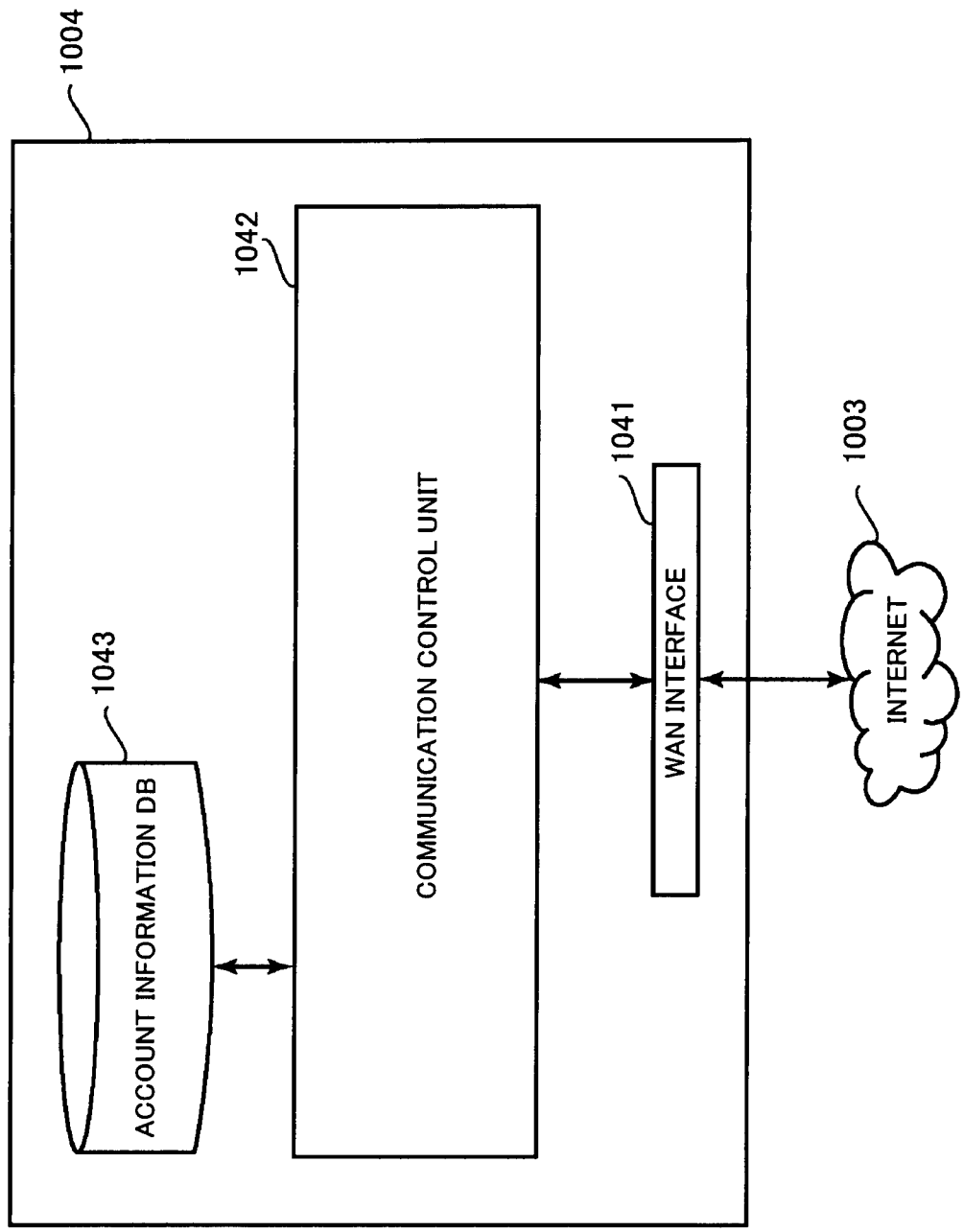
FIG. 8 illustrates a functional block diagram of a SIP server.

FIG. 8 illustrates a functional block diagram of the SIP server 1004. As illustrated in FIG. 8, the SIP server 1004 preferably includes a WAN interface 1041, a communication control unit 1042 and an account information database 1043.

The WAN interface 1041 uses the global IP address to carry out communications with the server and the terminal each connected to the Internet 1003. The SIP server 1004 can carry out communications with the file transfer servers 1013, 1023 and 1053 through the WAN interface 1041.

The communication control unit 1042 controls various communications carried out through the WAN interface 1041. The communication control unit 1042 controls communication processing according to a protocol such as a TCP/IP, a UDP or a SIP.

The communication control unit 1042 receives an account registration request (REGISTER) from the file transfer server connected to the Internet 1003, and registers account information of the file transfer server in the account information database 1043. For example, the SIP server 1004 receives the account registration request (REGISTER) from the file transfer server 1013, and registers the account information of the file transfer server 1013 in the account information database 1043.

The communication control unit 1042 also relays various types of communication data such as a SIP method and a response from one of the file transfer servers 1013, 1023 and 1053 to one of the other two file transfer servers.

Figure 9:
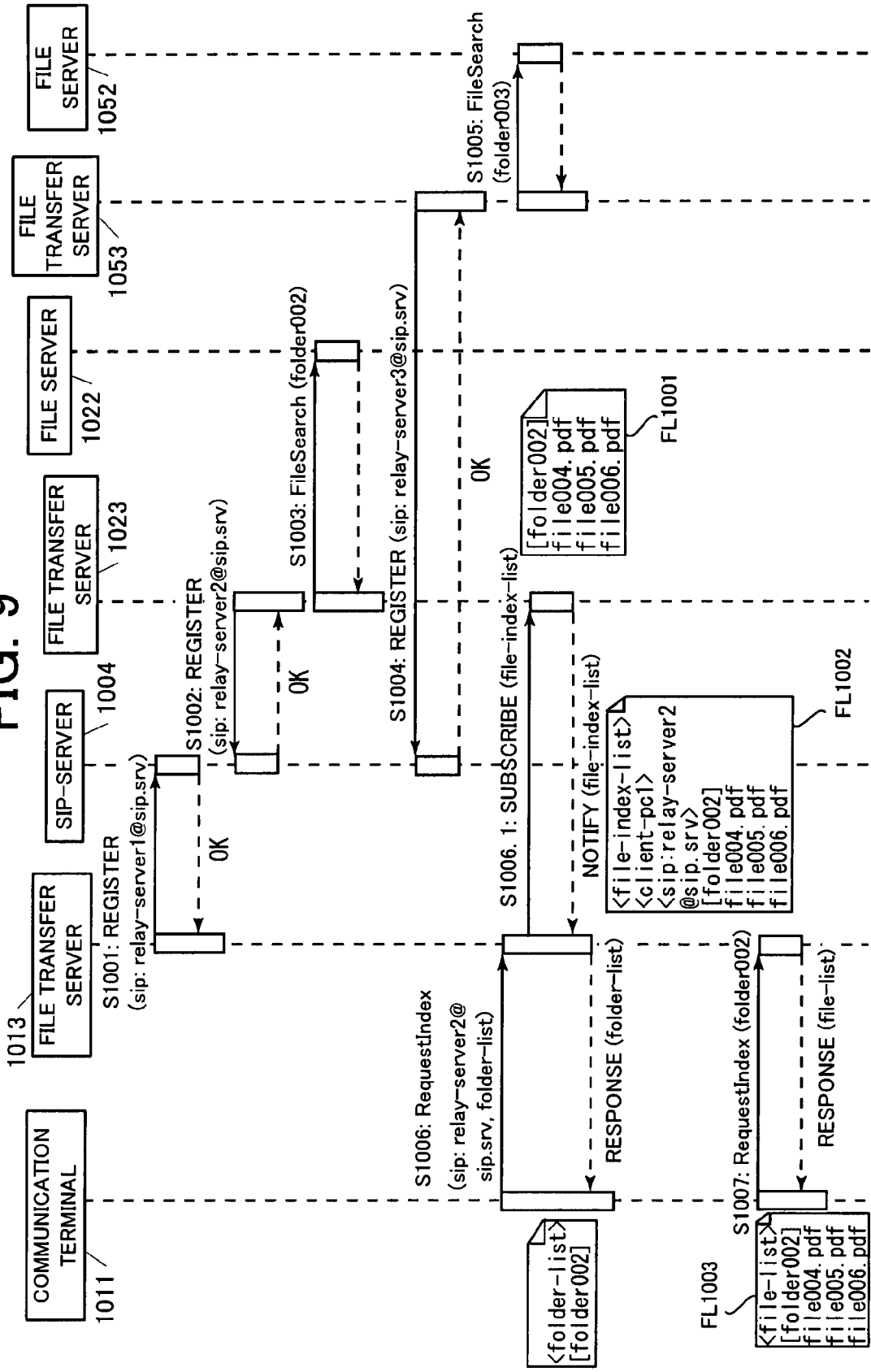
FIG. 9 illustrates a sequence of communication processing.
Figure 10:
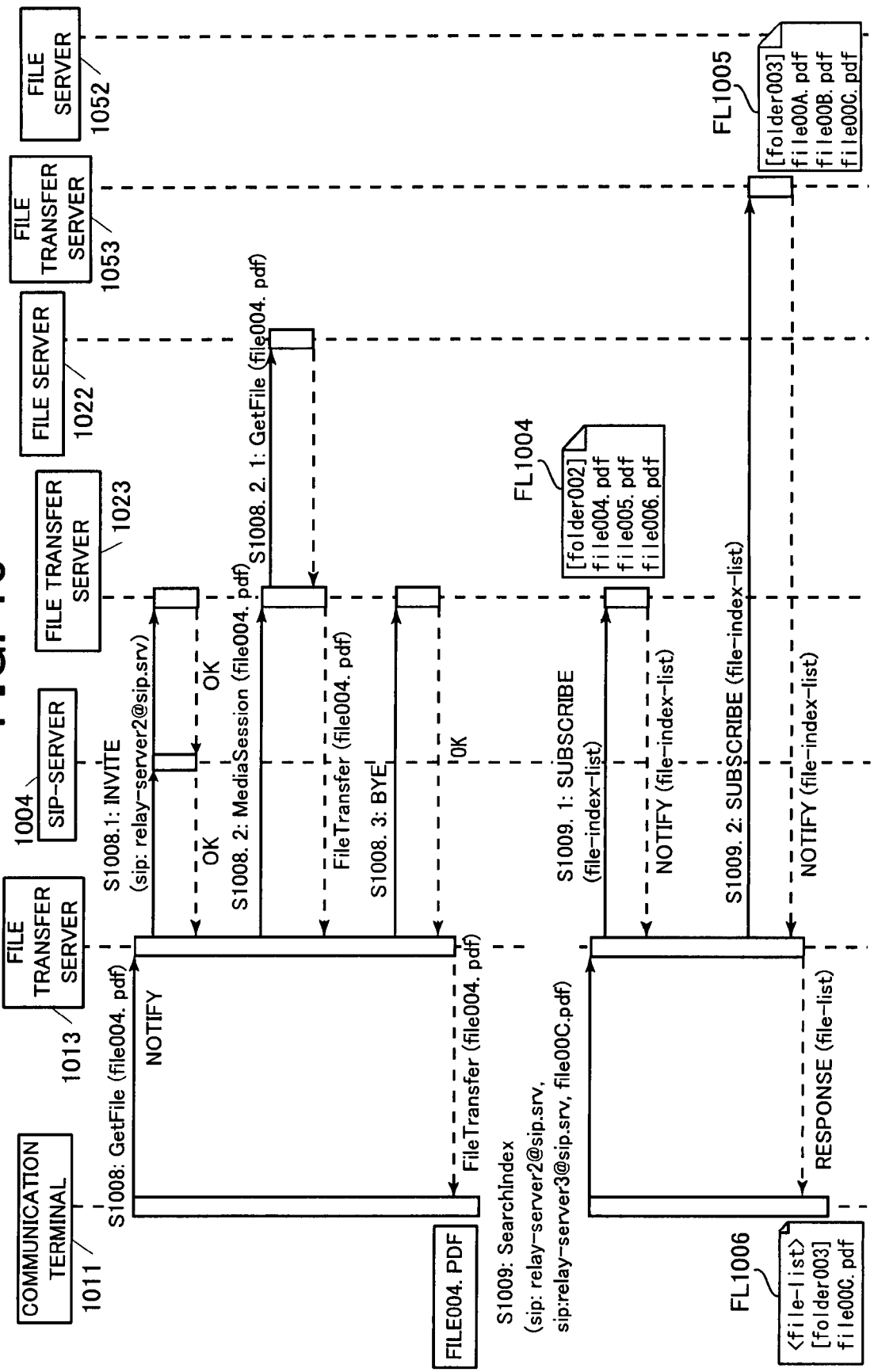
FIG. 10 illustrates a sequence of the communication processing.
Figure 11:
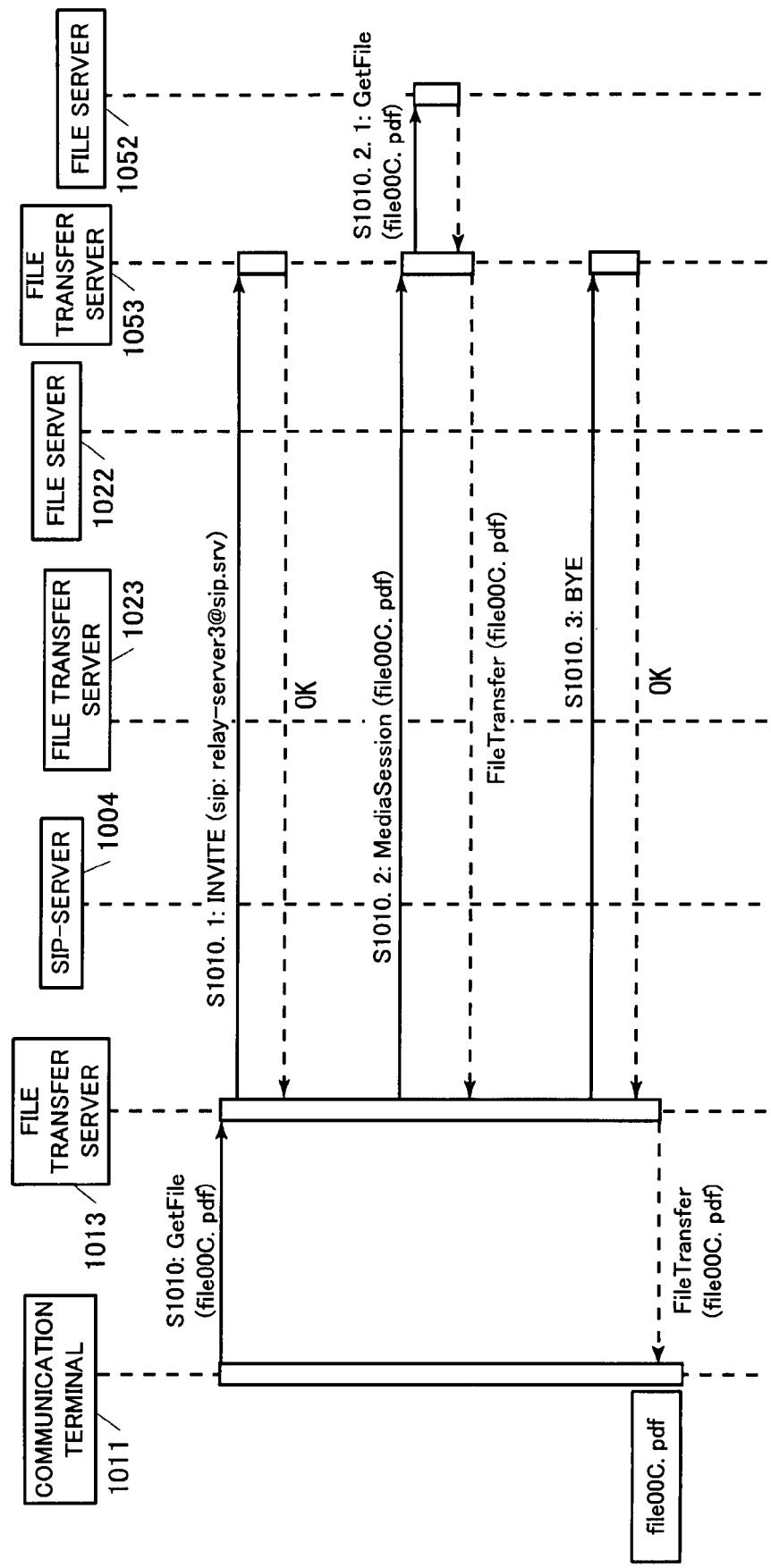
FIG. 11 illustrates a sequence of the communication processing.

With reference to processing sequence diagrams in FIGS. 9 to 11, next, description will be given of a flow of the communication processing in the communication system configured as described above. Herein, FIG. 9 illustrates a sequence from step S1001 to step S1007. FIG. 10 illustrates a sequence from step S1008, which is subsequent to step S1007, to step S1009. FIG. 11 illustrates a sequence of step S1010.

First, the file transfer server 1013 issues an account registration request (REGISTER) to the SIP server 1004 (step S1001). As illustrated in FIG. 9, herein, the file transfer server 1013 makes a request to register an account (SIP:relay-server1@sip.srv) thereof. The SIP server 1004 sends an OK response back to the file transfer server 1013, and registers the account of the file transfer server 1013 in the account information database 1043 while bringing the account into correspondence with the global IP address of the file transfer server 1013. In order to perform user authentication through a password, the password is previously registered in the account information database 1043 while being brought into correspondence with the account of the file transfer server. In this case, a user sends the password upon receipt of a request to register the password. If the authentication is successfully performed, the account is registered while being brought into correspondence with the IP address.

Successively, the file transfer server 1023 issues an account registration request (REGISTER) to the SIP server 1004 (step S1002). As illustrated in FIG. 9, herein, the file transfer server 1023 makes a request to register an account (SIP:relay-server2@sip.srv) thereof. The SIP server 1004 sends an OK response back to the file transfer server 1023, and registers the account of the file transfer server 1023 in the account information database 1043 while bringing the account into correspondence with the global IP address of the file transfer server 1023. Herein, user authentication through a password may be performed as in the aforementioned manner.

Next, the file transfer server 1023 accesses the file server 1022 to perform file search (step S1003). As a target for the file search, herein, a shared folder (folder002) in the file server 1022 is registered in the file transfer server 1023. Therefore, the file transfer server 1023 performs the file search on the shared folder (folder002). As a result of the file search, the file transfer server 1023 receives the file list from the file server 1022, and then stores the file list in the file list database 1104 thereof.

Successively, the file transfer server 1053 issues an account registration request (REGISTER) to the SIP server 1004 (step S1004). Thus, the SIP server 1004 registers therein an account (SIP:relay-server3@sip.srv) of the file transfer server 1053.

Next, the file transfer server 1053 accesses a shared folder (folder003) in the file server 1052 to perform file search (step S1005). As a target for the file search, herein, the shared folder (folder003) in the file server 1052 is registered in the file transfer server 1053. As a result of the file search, the file transfer server 1053 receives the file list from the file server 1052, and then stores the file list in the file list database 1104 thereof. Although not illustrated in FIG. 9, likewise, a list of the files shared in the LAN 1001 is prepared for the file transfer server 1013.

Next, the communication terminal 1011 makes a request to acquire a shared folder list (step S1006). This request designates a file transfer server which transfers the file list. In this example, the request designates the account (SIP:relay-server2@sip.srv) of the file transfer server 1023.

In accordance with this designation, the file transfer server 1013 issues a file list transfer request (SUBSCRIBE) to the file transfer server 1023 (step S1006.1). In response thereto, the file transfer server 1023 sends a file list to the file transfer server 1013 by a NOTIFY method. That is, the file transfer server 1023 sends the list of the files shared in the LAN 1002. The file list FL1001 to be sent herein is illustrated in FIG. 9. As illustrated in FIG. 9, three files (file004.pdf, file005.pdf, file006.pdf) contained in the shared folder (folder002) in the file server 1022 are recorded in the file list FL1001.

Herein, access restriction may be imposed on the shared file. In such a case, the transfer request issued in step S1006.1 designates an account (client-pc1) of the communication terminal 1011 which issues the acquisition request. The file transfer server 1023 sends only an accessible file list to the communication terminal 1011. In addition, the communication terminal 1011 may designate a folder or file to be contained in a file list. In this case, the file transfer server 1013 or the file transfer server 1023 sends only a list, which corresponds to the designated folder or file, to the communication terminal 1011.

The file transfer server 1013 stores the received file list in the file list database 1104 while bringing the file list into correspondence with the account (SIP:relay-server2@sip.srv) of the file transfer server 1023 and the account (client-pc1) of the communication terminal 1011 which issues the acquisition request. The stored file list FL1002 is illustrated in FIG. 9. As illustrated in FIG. 9, the file list FL1002 is dedicated solely to the communication terminal 1011.

The file transfer server 1013 records therein the file list brought into correspondence with the communication terminal 1011, and then sends the folder list contained in the file list to the communication terminal 1011. In this example, the file transfer server 1013 sends information about the shared folder (folder002) contained in the file list FL1002 to the communication terminal 1011.

Successively, the communication terminal 1011 issues to the file transfer server 1013 a request to refer to file information of the shared folder (folder002) (step S1007). Upon receipt of the request, the file transfer server 1013 sends to the communication terminal 1011 a file list FL1003 of the shared folder (folder002) stored in the file list database 1104. Thus, the communication terminal 1011 can view the files in the shared folder (folder002).

Next, the communication terminal 1011 sends to the file transfer server 1013 a request to acquire the file (file004.pdf) in the file list to which the communication terminal 1011 refers (step S1008).

Upon receipt of the acquisition request, the file transfer server 1013 checks a file transfer server from which the file list having the target file registered therein is acquired. In this example, that is, the file (file004.pdf) is registered in the file list acquired from the file transfer server 1023. Therefore, the file transfer server 1013 specifies the file transfer server 1023 as a source of the file.

Herein, only the file list corresponding to the file transfer server 1023 is recorded in the file list FL1002 illustrated in FIG. 9. However, when the communication terminal 1011 issues a request, which is similar to the request issued in step S1006, to each of the plural file transfer servers, the lists corresponding to the respective file transfer servers are added to the file list FL1002.

Next, the file transfer server 1013 sends to the SIP server 1004 a connection request command (INVITE method) for a connection with the file transfer server 1023 specified as a source of the file (step S1008.1). In the INVITE method, the file transfer server 1013 designates the account (SIP:relay-server2@sip.srv) of the file transfer server 1023. The SIP server 1004 refers to the account information database 1043, thereby acquiring the global IP address of the file transfer server 1023. Then, the SIP server 1004 relays the INVITE method from the file transfer server 1013 to the file transfer server 1023.

As described above, when the file transfer server 1013 issues the connection request command to the file transfer server 1023, the file transfer server 1023 transfers an OK response to the file transfer server 1013 via the SIP server 1004. Thus, a media session is established between the file transfer servers 1013 and 1023 by acceptance of the connection request command (step S1008.2).

When the media session is established, the file transfer server 1013 issues a file acquisition command to the file transfer server 1023. In accordance with this command, the file transfer server 1023 acquires the file from the file server 1022 (step S1008.2.1). That is, the file transfer server 1023 acquires the file (file004.pdf) stored in the shared folder (folder002) in the file server 1022. Then, the file transfer server 1023 transfers the file acquired from the file server 1022 to the file transfer server 1013 through the media session.

Upon receipt of the file from the file transfer server 1023, the file transfer server 1013 issues a session end request (BYE) to the file transfer server 1023 (step S1008.3). Thus, the media session between the file transfer servers is disconnected.

Then, the file transfer server 1013 sends to the communication terminal 1011 the file (file004.pdf) transferred from the file transfer server 1023. Thus, the communication terminal 1011 can acquire the file shared in the remote LAN 1002. In the foregoing description, the communications between the communication terminal 1011 and the file transfer server 1013 and the communications between the file transfer server 1023 and the file server 1022 may be carried out through a protocol such as an NFS or an SMB.

As described above, the first file transfer server sends the SUBSCRIBE method to the second file transfer server to make a request to transfer the file list. Upon receipt of the transfer request, then, the second file transfer server continuously sends a notification about update of the file list and a latest file list to the first file transfer server. That is, if the files shared in the LAN, to which the second file transfer server is connected, are subjected to addition or deletion, the second file transfer server sends update information about the file list to the first file transfer server. Then, the first file transfer server, which has sent the SUBSCRIBE method to issue the transfer request, receives the file list, and then administers the file list while bringing the file list into correspondence with the communication terminal which issues a request to acquire the file list. After completion of the administration (during a period that the SUBSCRIBE method is effective), accordingly, the communication terminal can refer to the shared file list dedicated solely to the first file transfer server even when accessing the first file transfer server at any time.

Next, description will be given of file retrieval processing. At a certain timing, the communication terminal 1011 issues a file retrieval request to the file transfer server 1013 (step S1009). As illustrated in FIG. 10, this retrieval request designates a file (file00C.pdf) to be retrieved and the accounts (SIP:relay-server2@sip.srv, SIP:relay-server3@sip.srv) of the file transfer servers 1023, 1053 in which the file is retrieved.

In the second preferred embodiment, the communication terminal 1011 which requests the retrieval designates the file transfer server in which the file is retrieved. Alternatively, the file transfer server 1013 may be previously set as the file transfer server in which the file is retrieved. It is sufficient in such a case that the communication terminal designates only the file to be retrieved. The file transfer server issues the retrieval request to a preset file transfer server.

First, the file transfer server 1013 issues a file list acquisition request (SUBSCRIBE) to the file transfer server 1023 in accordance with the designation by the communication terminal 1011 (step S1009.1). In response thereto, the file transfer server 1023 sends a file list FL1004 to the file transfer server 1013. Herein, description about step S1009 and steps subsequent thereto is separate from description about step S1008 and the steps prior thereto. If the SUBSCRIBE method issued in step S1006 is still effective, the processing in step S1009.1 becomes unnecessary because of the following reason. Subsequently to step S1006, that is, the file transfer server 1023 constantly sends a latest file list to the file transfer server 1013.

Likewise, the file transfer server 1013 issues a file list acquisition request to the file transfer server 1053 (step S1009.2). Then, the file transfer server 1053 sends a file list FL1005 to the file transfer server 1013. Herein, the three files (file00A.pdf, file00B.pdf, file00C.pdf) contained in the shared folder (folder003) in the file server 1052 are recorded in the file list FL1005.

The file transfer server 1013 retrieves the file lists acquired from the file transfer servers 1023 and 1053 to recognize presence of the file (file00C.pdf) to be retrieved. Herein, the file (file00C.pdf) to be retrieved is in the file list FL1005 acquired from the file transfer server 1053; therefore, the file transfer server 1053 sends a file list FL1006 to the communication terminal 1011.

Next, the communication terminal 1011 issues to the file transfer server 1013 a request to acquire the file (file00C.pdf) recorded in the acquired file list (step S1010).

Upon receipt of the acquisition request, the file transfer server 1013 issues a connection request command (INVITE method) to the file transfer server 1053 (step S1010.1); thus, a media session is established between the file transfer servers 1013 and 1053 (step S1010.2). Then, the file transfer server 1013 issues a file acquisition command to the file transfer server 1053. In accordance with this command, the file transfer server 1053 acquires the file (file00C.pdf) from the file server 1052 (step S1010.2.1). Then, the file transfer server 1053 transfers the file acquired from the file server 1052 to the file transfer server 1013 through the media session. Successively, the file transfer server 1013 issues a session end request (BYE) to the file transfer server 1053 (step S1010.3).

Next, the file transfer server 1013 receives the file (file00C.pdf) from the file transfer server 1053, and then sends the file (file00C.pdf) to the communication terminal 1011. Thus, the communication terminal 1011 designates a file name as a retrieval target, thereby acquiring a file shared in the remote LAN 1002. In the foregoing description, the communications between the communication terminal 1011 and the file transfer server 1013 and the communications between the file transfer server 1053 and the file server 1052 may be carried out through a protocol such as an NFS or an SMB.

As described above, preferred embodiments of the present invention allow shared use of a file between remote LANs via the Internet. A file list acquired from a file transfer server on one LAN is stored in a file transfer server on another LAN and, therefore, has no problems in terms of security. Thus, such a file list can be prevented from being referred to by an external device. In other words, a communication terminal on a first LAN does not directly refer to a list of files shared in a second LAN, but refers to the file list acquired by a file transfer server. Thus, the communication terminal can use the files in the second LAN as if the files are shared between the two LANs.

A file list acquired by a file transfer server is administered while being brought into correspondence with a communication terminal which issues a request to acquire the file. In the second preferred embodiment, as an example, the description is given of the case where the file transfer server 1013 administers the file list dedicated solely to the communication terminal 1011. Likewise, the file transfer server 1013 administers file lists dedicated to respective communication terminals each connected to the LAN 1001. Accordingly, each communication terminal can specially use a shared file list to which the communication terminal frequently refers. Further, when a communication terminal designates a file to be retrieved, a file transfer server finds the target file from a list of files shared in another LAN, and then provides a result of the retrieval. Thus, the communication terminal can use a file in another LAN via the Internet.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. A first file transfer server provided on a first local area network to carry out communications with an external server on a wide area network, the first file transfer server comprising:
   a list preparation section arranged to collect file information in the first local area network to prepare a file list;
   a registering section arranged to register account information of the first file transfer server in the external server;
   a list exchange section arranged to designate a second file transfer server on a second local area network registered in the external server to exchange file lists with the second file transfer server on the second local area network via the external server, to issue a request to the second file transfer server to send a file list, to receive and store the file list sent by the second file transfer server, and to bring the stored file list into correspondence with account information of the second file transfer server such that the account information of the second file transfer server is added to the stored file list when the stored file list is brought into correspondence with the account information of the second file transfer server, wherein the account information of the second file transfer server included in the stored file list is also registered in the external server;
   a request receiving section arranged to receive a request to acquire a file contained in the exchanged file list, from a communication terminal on the first local area network;
   a second file transfer server specifying section arranged to specify the second file transfer server on the second local area network in which the file is registered to establish a relaying communication session with the second file transfer server based on the account information of the second file transfer server that has been added to the stored file list;
   an acquisition request section arranged to issue a request to the second file transfer server to acquire the file; and
   a file receiving and sending section arranged to receive the file from the second file transfer server on the second local area network via the relaying communication session and to send the file to the communication terminal on the first local area network; wherein
   the file is retrieved from a separate file server on the second local area network by the second file transfer server in response to the second file transfer server receiving the request to acquire the file.

2. The first file transfer server according to claim 1, wherein the list exchange section includes a section arranged to allow the second transfer server to transfer an updated file list when contents of the file list is changed.

3. The first file transfer server according to claim 1, wherein the list preparation section includes a section arranged to regularly refer to a folder registered in the first local area network and to automatically update the file list when a file configuration of the folder is changed.

4. The first file transfer server according to claim 1, wherein the external server is a SIP server, and the relaying communication session is a media session.

5. A first file transfer server provided on a first local area network to carry out communications with an external server on a wide area network, the first file transfer server comprising:
   a list preparation section arranged to collect file information in the first local area network to prepare a file list;
   a registering section arranged to register account information of the first file transfer server in the external server;
   an acquisition section arranged to acquire a file list, via the external server, from a second file transfer server on a second local area network designated by a communication terminal on the first local area network and registered in the external server;
   a storage section arranged to store the acquired file list while bringing the stored file list into correspondence with account information of the second file transfer server such that the account information of the second file transfer server is added to the stored file list when the stored file list is brought into correspondence with the account information of the second file transfer server, and while bringing the stored file list into correspondence with account information of the communication terminal such that the account information of the communication terminal is added to the stored file list when the stored file list is brought into correspondence with the account information of the communication terminal;
   a request receiving section arranged to receive a request to refer to the file list from the communication terminal on the first local area network, to provide the file list brought into correspondence with the account information of the second file transfer server, and to receive from the communication terminal on the first local area network a request to acquire a file contained in the file list brought into correspondence with the account information of the second file transfer server, to establish a relaying communication session with the second file transfer server on the second local area network in which the file is registered, and to issue a request to the second file transfer server to acquire the file; and
   a file receiving and sending section arranged to receive the file from the second file transfer server on the second local area network via the relaying communication session and to send the file to the communication terminal on the first local area network; wherein
   the file is retrieved from a separate file server on the second local area network by the second file transfer server in response to the second file transfer server receiving the request to acquire the file.

6. The first file transfer server according to claim 5, wherein the external server is a SIP server, and the relaying communication session is a media session.

7. A first file transfer server provided on a first local area network to carry out communications with an external server on a wide area network, the first file transfer server comprising:
   a list preparation section arranged to collect file information in the first local area network to prepare a file list;
   a registering section arranged to register account information of the first file transfer server in the external server;
   a receiving section arranged to receive a command to retrieve a file from a communication terminal on the first local area network to acquire a file list, via the external server, from a second file transfer server on a second local area network registered in the external server and designated by the communication terminal;
   a storage section arranged to store the acquired file list while bringing the acquired stored file list into correspondence with account information of the second file transfer server such that the account information of the second file transfer server is added to the stored file list when the stored file list is brought into correspondence with the account information of the second file transfer server, and while bringing the stored file list into correspondence with account information of the communication terminal such that the account information of the communication terminal is added to the stored file list when the stored file list is brought into correspondence with the account information of the communication terminal;

a file list providing section arranged to provide, when the file to be retrieved is contained in the acquired file list, the file list to the communication terminal;

a request receiving section arranged to receive a request to acquire the file from the communication terminal on the first local area network, establish a relaying communication session with the second file transfer server on the second local area network in which the file is registered, and issue a request to the second file transfer server to acquire the file; and a file receiving and sending section arranged to receive the file from the second file transfer server on the second local area network via the relaying communication session and to send the file to the communication terminal on the first local area network; wherein the file is retrieved from a separate file server on the second local area network by the second file transfer server in response to the second file transfer server receiving the request to acquire the file.

8. The first file transfer server according to claim 7, wherein the external server is a SIP server, and the relaying communication session is a media session.

9. A first file transfer server provided on a first local area network to carry out communications with an external server on a wide area network, the first file transfer server comprising:

a list preparation section arranged to collect file information in the first local area network to prepare a file list;

a registering section arranged to register account information of the first file transfer server in the external server;

a receiving section arranged to receive a command to retrieve a file from a communication terminal on the first local area network to acquire a file list, via the external server, from a second file transfer server on a second local area network registered in the external server and set previously, a storage section arranged to store the acquired file list while bringing the acquired stored file list into correspondence with account information of the second file transfer server such that the account information of the second file transfer server is added to the stored file list when the stored file list is brought into correspondence with the account information of the second file transfer server, and while bringing the stored file list into correspondence with account information of the communication terminal such that the account information of the communication terminal is added to the stored file list when the stored file list is brought into correspondence with the account information of the communication terminal;

a relaying communication establishing section arranged to establish a relaying communication session with the second file transfer server on the second local area network in which the designated file is registered;

an acquisition request section arranged to issue a request to the second file transfer server to acquire the file;

a file list providing section arranged to provide, when the file to be retrieved is contained in the acquired file list, the file list to the communication terminal; and a file receiving and sending section arranged to receive the file from the second file transfer server on the second local area network via the relaying communication session and to send the file to the communication terminal on the first local area network; wherein the file is retrieved from a separate file server on the second local area network by the second file transfer server in response to the second file transfer server receiving the request to acquire the file.

10. The first file transfer server according to claim 9, wherein the external server is a SIP server, and the relaying communication session is a media session.

\* \* \* \* \*